US010935832B2

(12) United States Patent
Tien et al.

(10) Patent No.: US 10,935,832 B2
(45) Date of Patent: Mar. 2, 2021

(54) OPTICAL FILM AND DISPLAY DEVICE HAVING THE SAME

(71) Applicant: AU OPTRONICS CORPORATION, Hsin-Chu (TW)

(72) Inventors: Kun-Cheng Tien, Hsin-Chu (TW); Meng-Lin Tsai, Hsin-Chu (TW); Yu-Hsuan Hung, Hsin-Chu (TW); Wei-Cheng Wong, Hsin-Chu (TW); Chin-An Lin, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 25 days.

(21) Appl. No.: 16/220,846

(22) Filed: Dec. 14, 2018

(65) Prior Publication Data

US 2019/0212607 A1    Jul. 11, 2019

Related U.S. Application Data

(60) Provisional application No. 62/614,911, filed on Jan. 8, 2018.

(30) Foreign Application Priority Data

Jul. 13, 2018    (TW) .................................. 107124370

(51) Int. Cl.
*G02F 1/1335*    (2006.01)
*G02F 1/1343*    (2006.01)
(Continued)

(52) U.S. Cl.
CPC ....... *G02F 1/133504* (2013.01); *G02B 5/021* (2013.01); *G02F 1/1343* (2013.01);
(Continued)

(58) Field of Classification Search
CPC ................................................. G02F 1/133504
See application file for complete search history.

(56) References Cited

U.S. PATENT DOCUMENTS 6,398,370 B1 *    6/2002    Chiu ...................... G02B 5/003
359/601
2010/0066957 A1 *    3/2010    Miyazaki ............. G02B 5/0231
349/112
(Continued)

FOREIGN PATENT DOCUMENTS

CN    102879944    1/2013
CN    105572959    5/2016
(Continued)

OTHER PUBLICATIONS

An office action from the TIPO dated Sep. 20, 2019.
Taiwan Intellectual Property Office, "Office action", dated Feb. 18, 2019.

*Primary Examiner* — Sang V Nguyen
(74) *Attorney, Agent, or Firm* — WPAT, PC

(57)    ABSTRACT

An optical film including a first layer and a second layer disposed on the first layer and attached to the first layer is provided. The first layer has a plurality of micro-structures respectively extending along a first direction and arranged side by side at an interval. The micro-structures protrude toward the second layer. A first pitch exists between each micro-structure and an adjacent micro-structure in a side-by-side arrangement direction. The first pitch is greater than 10 times a wavelength of an incident light. Moreover, a display device including the foregoing optical film is also provided.

26 Claims, 20 Drawing Sheets

(51) Int. Cl.
  *G02B 5/02*      (2006.01)
  *G02F 1/13357*   (2006.01)
  *G02F 1/1337*    (2006.01)
(52) U.S. Cl.
  CPC .. *G02F 1/133524* (2013.01); *G02F 1/133526* (2013.01); *G02F 1/133603* (2013.01); *G02F 1/133707* (2013.01); *G02F 2001/133562* (2013.01); *G02F 2001/133567* (2013.01); *G02F 2201/40* (2013.01)

(56) References Cited

U.S. PATENT DOCUMENTS

| | | | | |
|---|---|---|---|---|
| 2013/0004967 A1* | 1/2013 | Halverson | .......... | G01N 21/6428 435/7.8 |
| 2014/0078434 A1* | 3/2014 | Qin | .......... | G02F 1/133512 349/42 |
| 2014/0151733 A1* | 6/2014 | Koike | .......... | G03F 7/0002 257/98 |
| 2014/0175543 A1* | 6/2014 | Glass | .......... | H01L 21/823431 257/337 |
| 2014/0267994 A1* | 9/2014 | Ryu | .......... | G02F 1/1393 349/141 |
| 2016/0202541 A1* | 7/2016 | Asaoka | .......... | G02F 1/133528 359/599 |
| 2016/0252665 A1* | 9/2016 | Lee | .......... | G02B 5/3083 359/489.07 |
| 2016/0325824 A1* | 11/2016 | Rawlings | .......... | B44B 5/0095 |
| 2017/0052287 A1* | 2/2017 | Lee | .......... | G02B 6/00 |
| 2017/0083137 A1* | 3/2017 | Kurasawa | .......... | G02F 1/1343 |
| 2018/0045876 A1* | 2/2018 | Lee | .......... | G02F 1/133528 |
| 2018/0107057 A1* | 4/2018 | Qin | .......... | G02F 1/133524 |
| 2018/0120149 A1* | 5/2018 | Chung | .......... | A61B 5/1172 |
| 2019/0285951 A1* | 9/2019 | Miyachi | .......... | C09K 19/56 |
| 2020/0057333 A1* | 2/2020 | Ju | .......... | B32B 27/08 |

FOREIGN PATENT DOCUMENTS

| | | | | |
|---|---|---|---|---|
| JP | 2008-003245 | * | 1/2008 | ........ G02F 1/13357 |
| JP | 2008003245 A | | 1/2008 | |
| JP | 2008065249 | | 3/2008 | |
| KR | 20150060935 A | | 6/2015 | |
| TW | 201631340 | | 9/2016 | |
| TW | 201643483 | | 12/2016 | |

* cited by examiner

OPTICAL FILM AND DISPLAY DEVICE HAVING THE SAME

BACKGROUND OF THE INVENTION

1. Field of the Invention

The present invention relates to an optical film and a display device having the same. Specifically, the present invention relates to the optical film for wide viewing angle display and the display device.

2. Description of the Prior Art

Display devices are widely applied in life, for example, to televisions, mobile telephones, and personal computers. To improve visual experience of users, industry operators are still continuously improving optical performance of the display devices. For example, for display devices with a relatively high requirement for a wide viewing angle display effect, as viewing angles of watching the display devices are changed, display images presented by some display devices are different. Compared with a display image watched at a front viewing angle, a display image watched at an oblique viewing angle may have a picture color washout problem, and consequently a display effect at a wide viewing angle is affected. Therefore, existing display devices still need to be improved.

SUMMARY OF THE INVENTION

An objective of the present invention is to provide an optical film to increase a light diffusion angle.

An objective of the present invention is to provide a display device having an optical film to improve the quality of an image displayed at an oblique viewing angle.

The optical film includes a first layer and a second layer disposed on the first layer and attached to the first layer. The first layer has a plurality of micro-structures respectively extending along a first direction and arranged side by side at an interval. The micro-structures protrude toward the second layer. A first pitch exists between each micro-structure and an adjacent micro-structure in a side-by-side arrangement direction. The first pitch is greater than 10 times a wavelength of an incident light.

The display device includes a display module, an optical film and a light source module. The display module has a plurality of sub-pixels, and the optical film is disposed on the display module. The light source module is disposed on a side of the display module opposite to the optical film to generate an incident light. A first pitch between each micro-structure and an adjacent micro-structure is greater than 10 times a wavelength of the incident light and less than 0.5 times a width of each sub-pixel. Therefore, the quantity of light emergent at an oblique viewing angle is increased.

DETAILED DESCRIPTION OF THE PREFERRED EMBODIMENT

The present invention provides an optical film and a display device having the same in order to alleviate a color washout problem of a display image by using a micro-structure of the optical film. Preferably, the display device of the present invention is a liquid crystal display having a backlight module, but is not limited thereto.

Figure 1A:
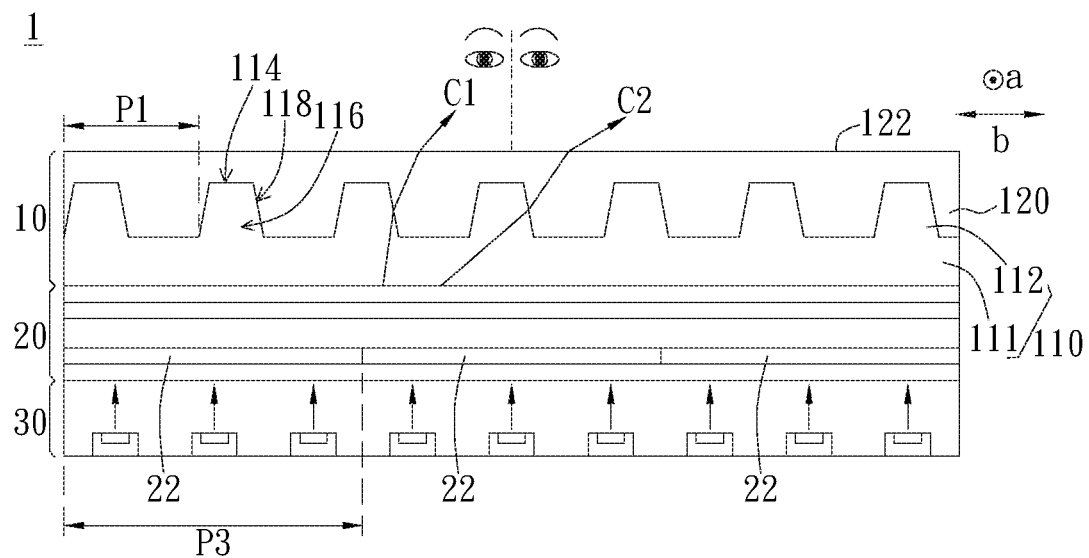
FIG. 1A is a schematic diagram of an embodiment of a display device according to the present invention.
Figure 1B:
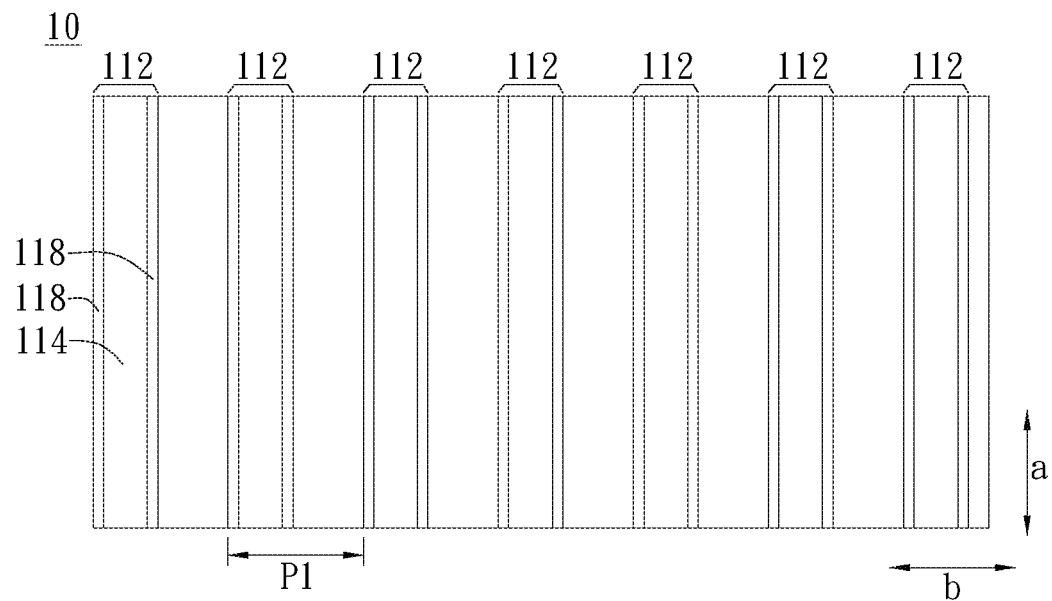
FIG. 1B is a top view of an embodiment of an optical film.

FIG. 1A is a schematic diagram of an embodiment of a display device 1 according to the present invention, and FIG. 1B is a top view of an embodiment of an optical film. As shown in FIG. 1A and FIG. 1B, the display device 1 includes a display module 20, an optical film 10 and a light source module 30. The display module 20 is preferably a liquid crystal display panel and has a plurality of sub-pixels 22. The optical film 10 is disposed on the display module 20. The light source module 30 is disposed on a side of the display module 20 opposite to the optical film 10 to generate an incident light. The optical film 10 is used to receive the incident light.

As shown in FIG. 1A and FIG. 1B, the optical film 10 includes a first layer 110 and a second layer 120 disposed on the first layer 110 and attached to the first layer 110. The first layer 110 has a plurality of micro-structures 112 respectively extending along a first direction (a) and arranged side by side at an interval. The micro-structures 112 protrude toward the second layer 120. That is, the first layer 110 borders the second layer 120 to form a non-planar interface, and the part in the interface sunk into the second layer 120 (a part relatively close to a light exiting surface 122) is the aforementioned micro-structure 112 protruding toward the second layer 120. In another viewpoint, the first layer 110 includes a base portion 111 and the micro-structure 112. The micro-structure 112 is located on the base portion 111 and stretches into the second layer 120. The second layer 120 has the light exiting surface 122 located on a surface of the second layer 120 opposite to the first layer 110. Please refer to FIG. 1B. FIG. 1B is a top view of an embodiment of an optical film 10. As shown in FIG. 1B, the micro-structures 112 are long-strip-shaped, extend along the first direction (a), and are arranged side by side at an interval along a direction (b).

As shown in FIG. 1A, each micro-structure 112 has a top surface 114, a bottom 116, and a connection surface 118 connecting the top surface 114 and the bottom 116. The bottom 116 is a lowest part of an oblique side, that is, a side of the micro-structure 112 close to the base portion 111. In the embodiment in FIG. 1A, the connection surface 118 is a surface having a single slope, and the optical film 10 is, for example, made of a material having a refractive index greater than 1. Light from the light source module 30 that passes through the connection surface 118 can increase an angle deviating from a front viewing angle and is emergent at an oblique viewing angle. For example, an observer is located in a direction of the front viewing angle (an axis of a sight line is parallel to a normal of a display surface), a light ray C1 and a light ray C2 from the light source module 30 are incident to the optical film 10. The light ray C1 has a relatively small incident angle, passes through the connection surface 118, and then slightly deviates from the front viewing angle. The light ray C2 has a relatively large incident angle, passes through the connection surface 118 and then is emergent from the light exiting surface 122 at a relatively large emergent angle. Therefore, the quantity of light emergent at the oblique viewing angles is increased.

Moreover, as shown in FIG. 1B, for each micro-structure 112, a first pitch P1 exists between corresponding locations of one micro-structure 112 and an adjacent micro-structure 112 in a side-by-side arrangement direction (b). The first pitch P1 includes a protruding part at which the micro-structure 112 is located and a planar part between two micro-structures 112. It should be understood that, the first pitch P1 may have different indication manners at corresponding locations of two micro-structures. A range of the first pitch P1 may correspond to one complete micro-structure 112 (as shown in FIG. 1A), or correspond to two incomplete micro-structures 112. The first pitch P1 is greater than 10 times a wavelength of the incident light. For example, when the incident light has a wavelength of 0.4 µm to 0.7 µm, the first pitch P1 may be, for example, equal to or greater than 7 µm. Therefore, the incident light is prevented from being diffracted after passing through the optical film 10. By using the foregoing design, a diffusion angle of light of the display device may be increased, so as to improve the quality of an image displayed at the oblique viewing angles.

Additionally, in another embodiment, the first layer 110 and the second layer 120 are made of materials having different refractive indexes, and a refractive index of the first layer 110 is less than a refractive index of the second layer 120. For example, the first layer 110 is made of PMMA (polymethyl methacrylate), and the second layer 120 is made of PET (polyethylene terephthalate). Because the connection surface 118 is an inclined surface relative to a direction of the incident light, by using the design in which the refractive index of the first layer 110 is less than the refractive index of the second layer 120, a diffusion angle of light passing through the connection surface 118 is increased, that is, an emergent angle of light emergent from the light exiting surface 122 is larger, so as to ensure that the quantity of light emergent at an oblique viewing angle can be increased. Therefore, the quality of an image displayed at an oblique viewing angle is improved. In a preferable embodiment, the difference between the refractive indexes of the first layer 110 and the second layer 120 is greater than 0.12.

Figure 2:
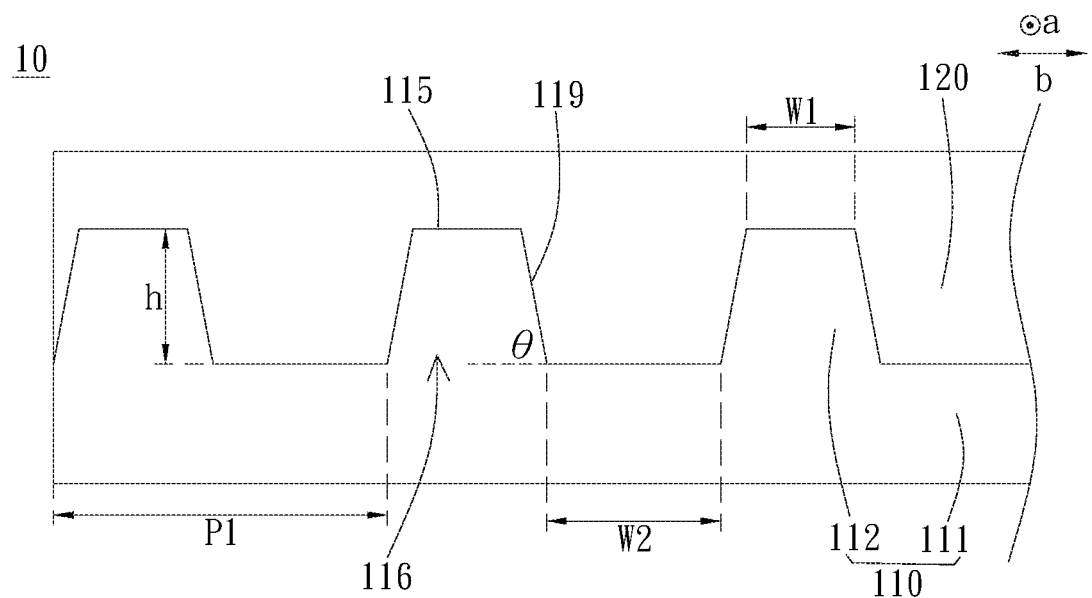
FIG. 2 is an enlarged cross-sectional view of the optical film.

FIG. 2 is an enlarged cross-sectional view of the optical film 10. As shown in FIG. 2, each micro-structure 112 has a top side 115 and a bottom 116 along a cross section transversely cutting a first direction (a), and has an oblique side 119 connecting the top side 115 and the bottom 116. An angle exists between the oblique side 119 and the bottom 116, and the angle ranges from 80 degrees to 90 degrees. That is, a connection surface has a base angle θ, and the base angle θ ranges from 80 degrees to 90 degrees. Therefore, light is prevented from being emergent from a light exiting surface at an emergent angle less than an incident angle after passing through the connection surface. Particularly, for a light ray whose incident angle is relatively large, by using the foregoing design, light is prevented from being guided to the front viewing angle, so as to ensure that the quantity of light emergent at an oblique viewing angle can be increased. Therefore, the quality of the image displayed at the oblique viewing angles is improved.

Moreover, as shown in FIG. 2, the micro-structure 112 has a height (h). Each micro-structure 112 has a first value defined as a difference between a width W1 of the top side 115 and a width of the bottom 116 (that is, a sum of distances at which the connection surface protrudes horizontally toward two sides, which can be indicated as 2h cot θ). In a preferable embodiment, a ratio of the first value to the first pitch P1 is less than 0.1. Therefore, luminance decrease amplitude at the front viewing angle can be controlled to be approximately 10%, and a contrast decrease amplitude at the front viewing angle can be controlled to be approximately 20%. That is, when color washout of a display image is alleviated, loss extents of a light transmittance and a contrast can be reduced.

Figure 3:
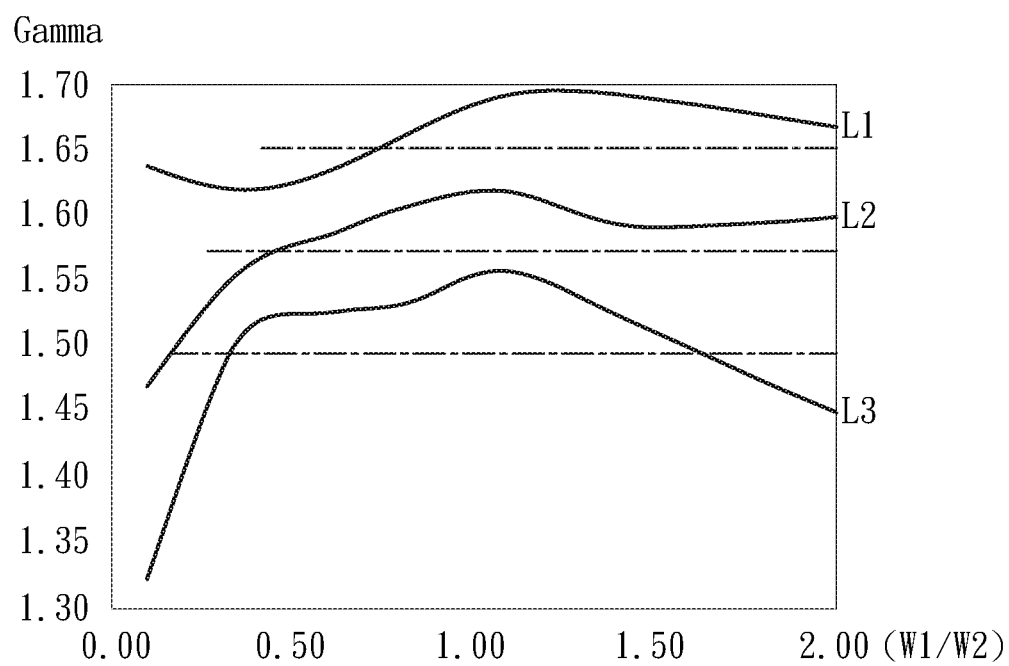
FIG. 3 is a diagram of a relationship between a width-to-spacing ratio of a micro-structure and a Gamma value.

Moreover, as shown in FIG. 2, for each micro-structure 112, a spacing W2 exists between the bottom 116 of one micro-structure 112 and the bottom 116 of the adjacent micro-structure 112. In a preferable embodiment, a ratio of the width W1 of the top side 115 to the spacing W2 ranges from 0.8 to 1.45. FIG. 3 is a diagram of a relationship between a width-to-spacing ratio (W1/W2) of the micro-structure and the Gamma value. As shown in FIG. 3, the transverse axis indicates a ratio of the width W1 of the top side to the spacing W2, and the longitudinal axis indicates the Gamma value (dimensionless). In FIG. 3, different curves indicate test results at different viewing angles, where a curve L1 indicates a viewing angle of 45 degrees, a curve L2 indicates 60 degrees, and a curve L3 indicates 75 degrees. The Gamma value is related to extent of a color washout improvement. When the Gamma value of the oblique viewing angle is closer to the Gamma value of the front viewing angle, it indicates that display images are more consistent at different viewing angles.

As shown in FIG. 3, as a width-to-spacing ratio changes, different viewing angles have different Gamma values, and the Gamma value change amplitude is relatively small (for example, within 5%) within some ratio range. Using the curve L3 as an example, the width-to-spacing ratio is within the range of approximately 0.4 to 1.5, the Gamma value is generally maintained between 1.50 and 1.55. When the width-to-spacing ratio is beyond the range of 0.4 to 1.5, the Gamma value is obviously decreased indicating that a difference of an effect of a display image and that of a display image at a front viewing angle is larger. For different curves, the width-to-spacing ratio corresponding to a smaller Gamma value change amplitude is approximately 0.8 to 1.45. Therefore, the quality of an image displayed at the oblique viewing angles is improved.

Table 1 shows a comparison result of Gamma values corresponding to different display devices at different viewing angles. A sample X is a display device in which no optical film is used. A sample A and a sample B are display devices in which an optical film of the present invention is used. For the optical film of the sample A, the base angle θ is 86 degrees, the width-to-spacing ratio (W1/W2) is 1.09, and the difference between refractive indexes of the first layer 110 and the second layer 120 is 0.12. For the optical film of the sample B, the base angle θ is 86 degrees, the width-to-spacing ratio (W1/W2) is 1.09, and the difference between refractive indexes of the first layer 110 and the second layer 120 is 0.17.

TABLE 1

|  | Viewing angle | | | |
| --- | --- | --- | --- | --- |
|  | 0 degrees (front viewing angle) | 45 degrees | 60 degrees | 75 degrees |
| Sample X | 2.2 | 1.5 | 1.22 | 0.96 |
| Sample A | 2.2 | 1.63 | 1.52 | 1.37 |
| Sample B | 2.2 | 1.69 | 1.62 | 1.56 |

As shown in Table 1, Gamma values of the sample A and the sample B at different oblique viewing angles are closer to the Gamma value (2.2) at the front viewing angle than Gamma values of the sample X at different oblique viewing angles. Moreover, Gamma values of the sample B at different oblique viewing angles are closer to the Gamma value at the front viewing angle than Gamma values of the sample A at different oblique viewing angles. Therefore, it can be known that when the refractive index difference is greater than 0.12, the quality of the image displayed at the oblique viewing angles can be further improved.

Figure 4:
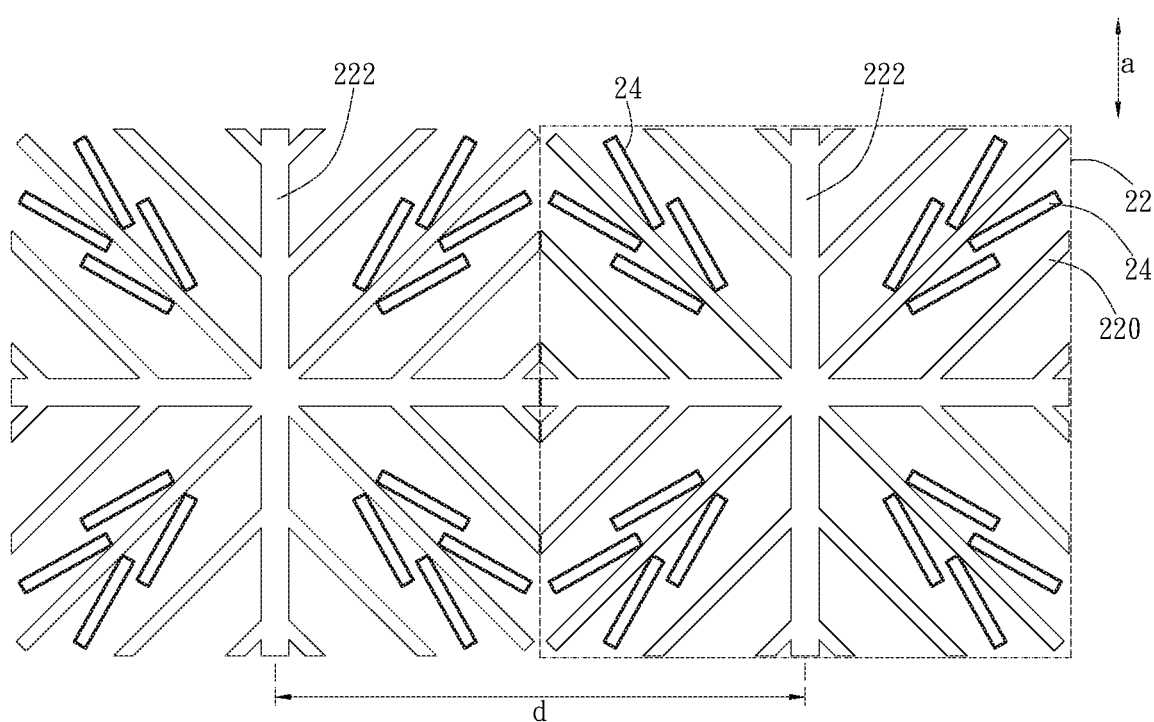
FIG. 4 is a schematic diagram of a pixel electrode.

FIG. 4 is a schematic diagram of a pixel electrode 220. FIG. 4 is an example of drawing a pixel electrode 220 used in multi-domain vertical alignment. As shown in FIG. 4, each sub-pixel 22 includes a pixel electrode 220. The pixel electrode 220 has an electrode trunk 222 extending along a first direction (a) and dividing the pixel electrode 220 into a plurality of areas. Liquid crystal molecules 24 in different areas have different falling directions. A width of the pixel electrode 220 can be defined based on a distance between different electrode trunks 222. A distance (d) between the electrode trunk 222 and an electrode trunk 222 of the adjacent sub-pixel 22 is generally equal to the width of the sub-pixel. For the display device utilized the pixel electrode shown in FIG. 4, the foregoing first pitch preferably cooperates with the width of the pixel electrode. Referring to FIG. 1A and FIG. 4, the first pitch P1 between the micro-structure 112 and the adjacent micro-structure 112 is less than 0.5 times a width P3 of each sub-pixel. That is, a half of the distance between the electrode trunk 222 of one sub-pixel and the electrode trunk 222 of the adjacent sub-pixel is greater than the first pitch P1. Light passing through different areas enable an observer located at the same oblique viewing angle (which is preferably an angle, greater than 45 degrees, between the axis of the sight line and the normal of the display surface) to have different experiences. Therefore, by using the foregoing design, the sub-pixel 22 has connection surfaces having different inclined directions in the same area, and light diffusion effects in different areas can tend to be consistent. On the whole, the first pitch P1 is greater than 10 times the wavelength of the incident light and less than 0.5 times the width P3 of each sub-pixel.

Figure 5:
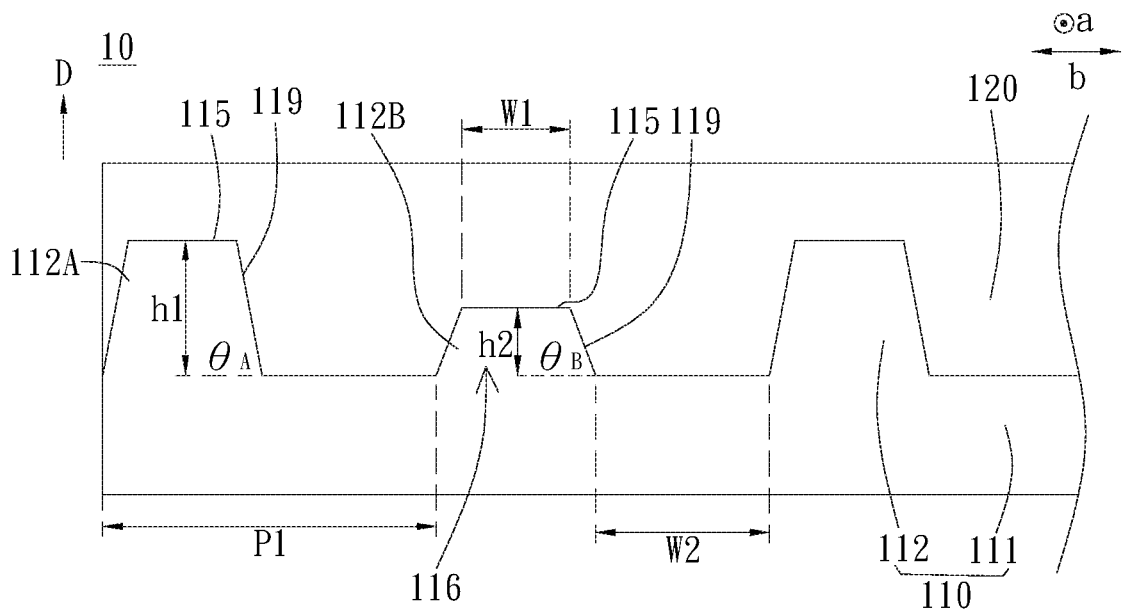
FIG. 5 is a schematic diagram of another embodiment of the optical film.

FIG. 5 is a schematic diagram of another embodiment of the optical film 10. As shown in FIG. 5, the optical film 10 is mixed with different types of micro-structures (112A and 112B). Specifically, along the cross section transversely cutting the first direction (a), each micro-structure has the oblique side connecting the top side and the bottom. The micro-structure has a first micro-structure 112A and an adjacent second micro-structure 112B staggered from each other. The first micro-structure 112A has a first height h1 greater than a second height h2 of the second micro-structure 112B along a protruding direction D. Moreover, a first angle $\theta_A$ exists between the oblique side 119 and the bottom 116 of the first micro-structure 112A. A second angle $\theta_B$ exists between the oblique side 119 and the bottom 116 of the second micro-structure 112B. The first angle $\theta_A$ is greater than the second angle $\theta_B$. That is, degrees of a base angle of the first micro-structure 112A are not equal to degrees of a base angle of the second micro-structure 112B. Therefore, different light diffusion effects may be provided.

Table 2 shows a comparison result of Gamma values corresponding to different display devices at different viewing angles. The sample X is the display device in which no optical film is used. A sample C is the display device in which the optical film shown in FIG. 5 is used. For the optical film of the sample C, base angles are 86 degrees (the first micro-structure) and 82 degrees (the second micro-structure), the width-to-spacing ratio (W1/W2) is 1.076, and the difference between refractive indexes of the first layer 110 and the second layer 120 is 0.17. It should be noted that, when the micro-structure in FIG. 5 is used, the width W1 of the top side 115 is defined as the width of the top side 115 of the second micro-structure 112B. The first pitch P1 is defined as the distance between corresponding locations of the first micro-structure 112A and the second micro-structure 112B in the side-by-side arrangement direction (b). The first pitch P1 includes a protruding part at which the first micro-structure 112A and the second micro-structure 112B are located and a planar part between the first micro-structure 112A and the second micro-structure 112B. It should be understood that, the first pitch P1 may have different indication manners at corresponding locations of two micro-structures. The range of the first pitch P1 may correspond to a complete first micro-structure 112A (as shown in FIG. 5) and the planar part between the first micro-structure 112A and the second micro-structure 112B, or may correspond to a complete second micro-structure 112B and the planar part between the first micro-structure 112A and the second micro-structure 112B, or may correspond to an incomplete first micro-structure 112A, an incomplete second micro-structure 112B and the planar part between the first micro-structure 112A and the second micro-structure 112B.

TABLE 2

| | Viewing angle | | | |
|---|---|---|---|---|
| | 0 degrees (front viewing angle) | 45 degrees | 60 degrees | 75 degrees |
| Sample X | 2.2 | 1.5 | 1.22 | 0.96 |
| Sample C | 2.2 | 1.69 | 1.56 | 1.39 |

As shown in Table 2, Gamma values of the sample C at different oblique viewing angles are closer to the Gamma value (2.2) at the front viewing angle than the Gamma value of the sample X at different oblique viewing angles. Therefore, it can be known that, the mixture of different types of micro-structures can also improve the quality of the image displayed at the oblique viewing angles.

Figure 6:
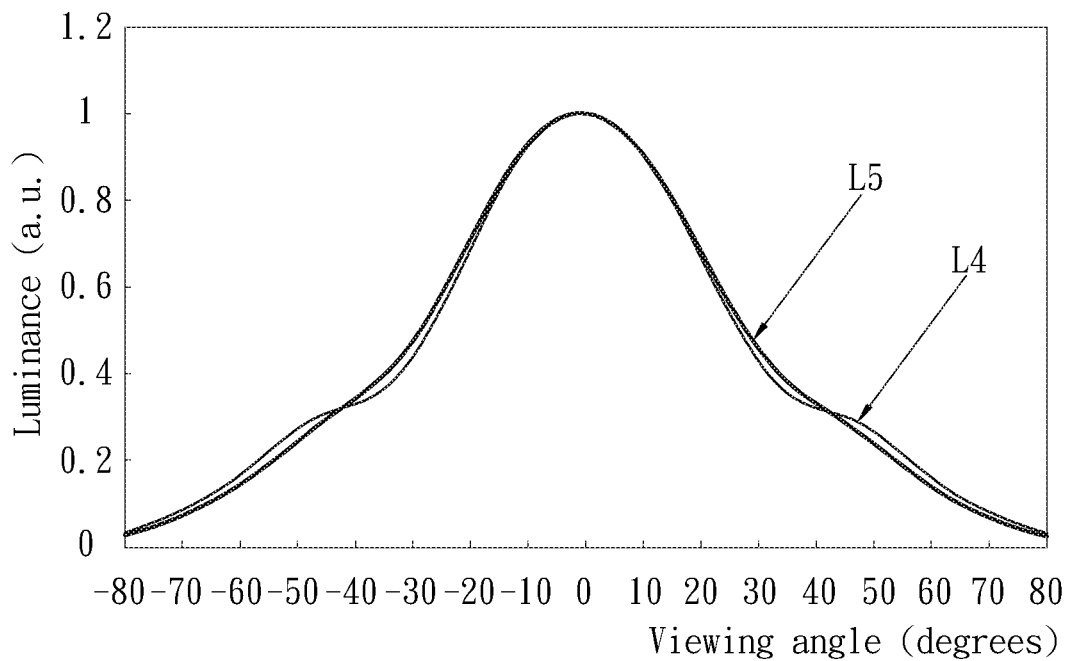
FIG. 6 is a diagram of a relationship between viewing angles and luminance.

Moreover, the display device utilized the optical film 10 shown in FIG. 5 can provide more even light distribution. FIG. 6 is a diagram of a relationship between different viewing angles and luminance. As shown in FIG. 6, the transverse axis indicates the viewing angle (degrees), and the longitudinal axis indicates luminance (which is arbitrary unit and is a standardized result). In FIG. 6, a curve L4 represents the display device whose optical film has single-typed micro-structures (such as FIG. 1A), and a curve L5 represents the display device whose optical film has mix-typed micro-structures (such as FIG. 5). As shown in FIG. 6, luminance distribution of the curve L5 is more even than that of the curve L4 at different oblique viewing angles.

Figure 7A:
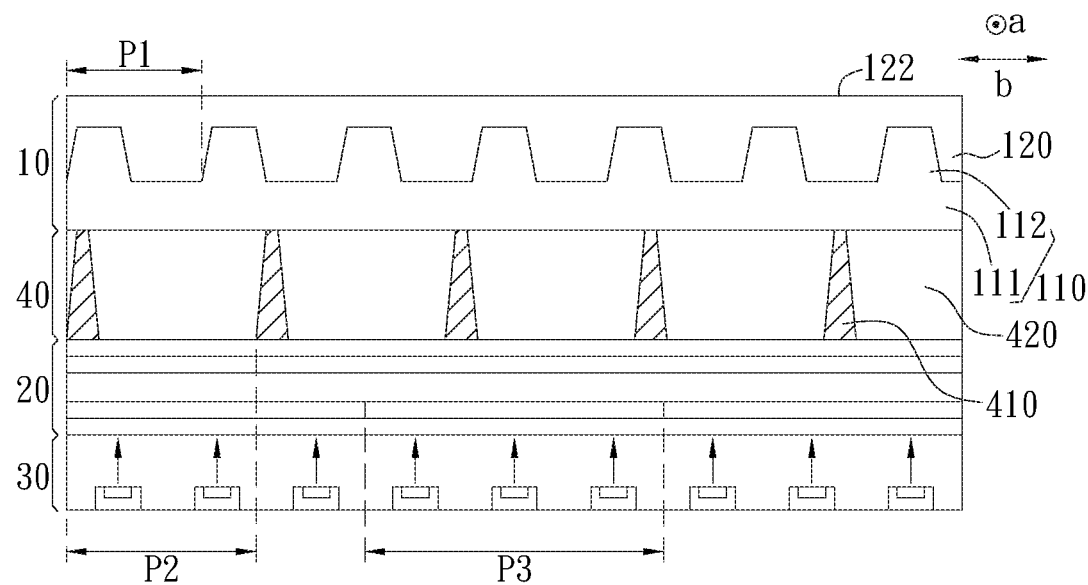
FIG. 7A is a schematic diagram of another embodiment of the display device.
Figure 7B:
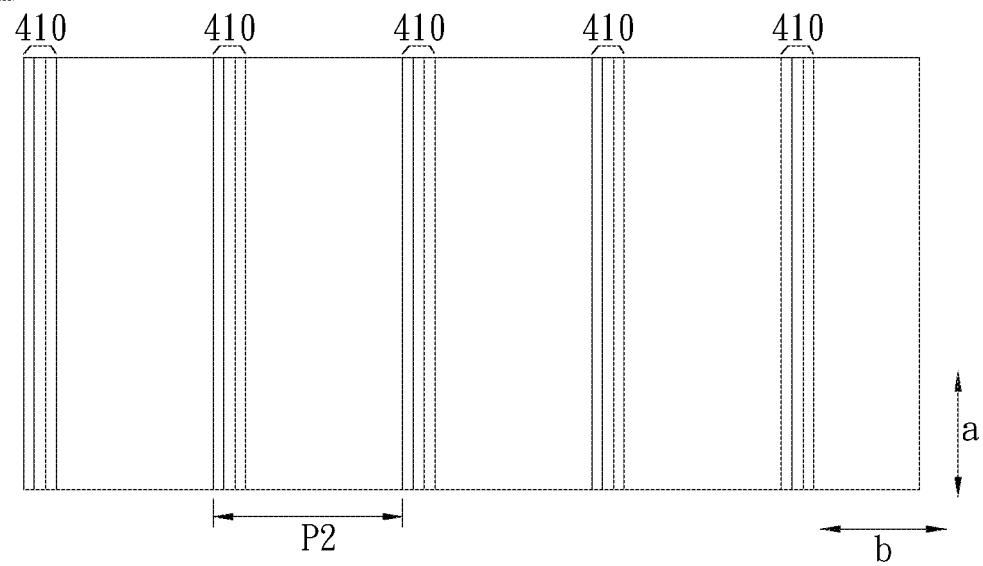
FIG. 7B is a top view of an embodiment of a collimation sheet.

FIG. 7A is a schematic diagram of another embodiment of the display device 1, and FIG. 7B is a top view of an embodiment of a collimation sheet 40. As shown in FIG. 7A and FIG. 7B, the display device 1 further includes a collimation sheet 40. The collimation sheet 40 is located between the light source module 30 and the optical film 10. In the embodiment in FIG. 7A, the collimation sheet 40 is disposed between the display module 20 and the optical film 10. Specifically, the collimation sheet 40 is disposed on the light source module 30 and located on an opposite side of the light exiting surface 122 of the optical film 10. The collimation sheet 40 has a plurality of light absorption structures 410 extending along the first direction (a) and arranged side by side at an interval. The light absorption structures 410 are long-strip-shaped, extend along the first direction (a), and are arranged side by side at an interval along the direction (b). A spacing layer 420 that can be light transmissive is filled between the light absorption structures 410. In an embodiment, a refractive index of the spacing layer 420 is greater than 1 and greater than the refractive index of the first layer 110 of the optical film 10.

As shown in FIG. 7A, for each light absorption structure 410, a second pitch P2 exists between corresponding locations of one light absorption structure 410 and an adjacent light absorption structure 410 in a side-by-side arrangement direction (b). At least one light absorption structure 410 is included within the second pitch P2, that is, a range of the second pitch P2 may correspond to one complete light absorption structure 410 (as shown in FIG. 7A), or may correspond to two incomplete light absorption structures 410. The second pitch P2 is less than the width P3 of each sub-pixel. Therefore, a moire, generated on a display image after a line (for example, a data line) around the sub-pixel and the light absorption structure 410 are superposed, can be alleviated. On the whole, the second pitch P2 is greater than the first pitch P1 and less than the width P3 of each sub-pixel.

Figure 7C:
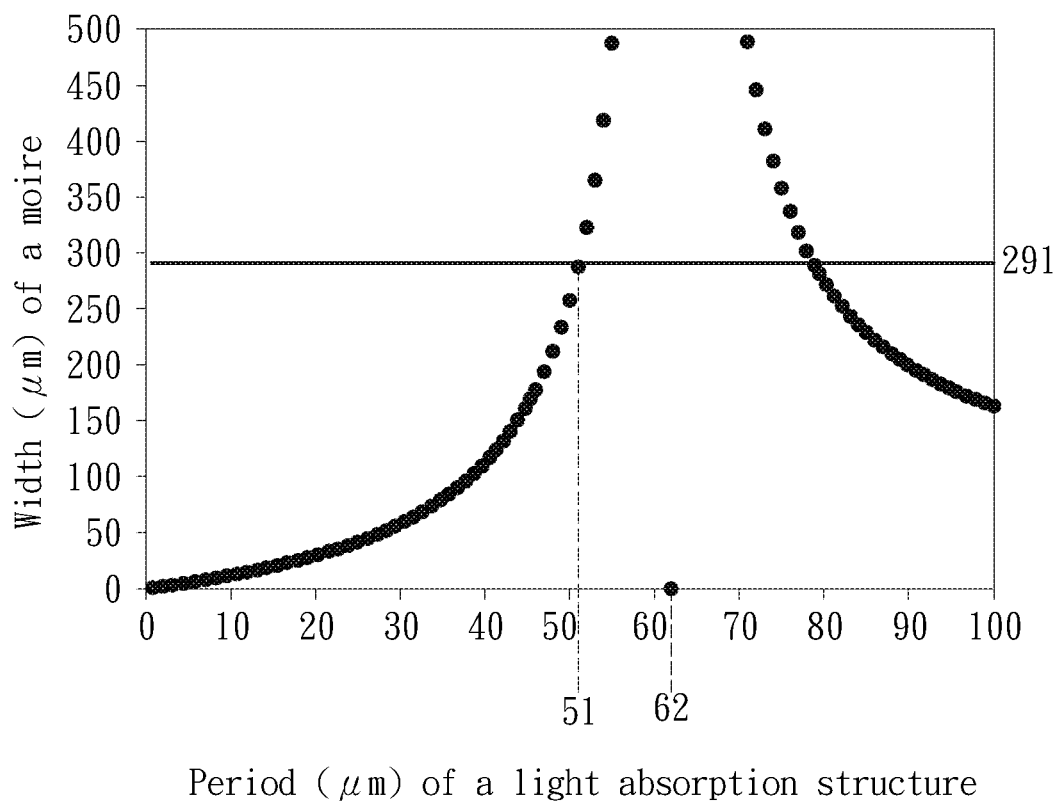
FIG. 7C is a diagram of a relationship between a period of a light absorption structure and a width of a moire.

FIG. 7C is a diagram of a relationship between a period of a light absorption structure and a width of a moire. As shown in FIG. 7C, the longitudinal axis indicates a width (μm) of a moire, and the transverse axis indicates a period (μm) of the light absorption structure, that is, the size of the second pitch P2. In FIG. 7C, the display device whose sub-pixel width is 62 μm is tested to find moire widths in different light absorption structure periods. A larger value of the moire width indicates a more obvious interference of the moire to the display image. Evaluation is performed by using 1 arcmin as an upper limit (this value represents a resolution of a human eye at a distance of 1 meter from an observed object, and it is approximately 291 μm in width that generally corresponds to 51 μm in the period), and it can be found that, when the second pitch P2 is less than 0.82 times the width P3 of each sub-pixel, the moire can be alleviated. If evaluation is performed by using 20 arcsec (this value represents a theoretical resolution of a human eye at a distance of 1 meter from an observed object, and it is approximately 97 μm in width that generally corresponds to 39 μm in the period), and preferably, it can be found that, when the second pitch P2 is less than 0.63 times the width P3 of each sub-pixel, the moire can be further alleviated.

Figure 8:
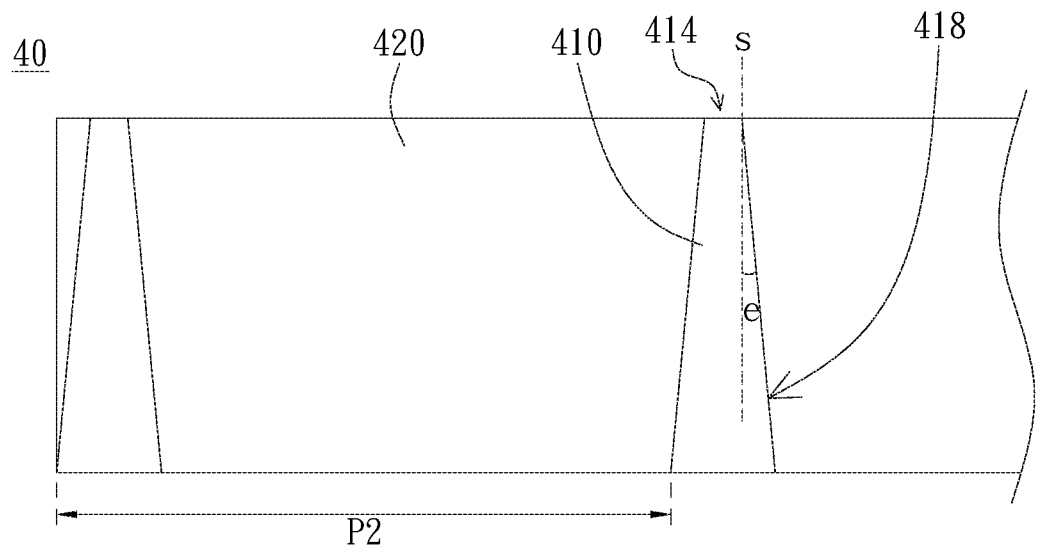
FIG. 8 is an enlarged cross-sectional view of the collimation sheet.

Table 3 shows the comparison result of Gamma values corresponding to different display devices at different viewing angles. The sample X is the display device in which no optical film is used. A sample D is the display device in which the optical film and the collimation sheet shown in FIG. 7A are used. For the optical film of the sample D, the base angle is 86 degrees, the first pitch is 30 μm, the width-to-spacing ratio (W1/W2) is 1.09, and the difference between refractive indexes of the first layer 110 and the second layer 120 is 0.17. For the collimation sheet of the sample D, the second pitch is 39 μm, and an angle (e) is 1.68 degrees (defined as the angle between the inclined surface 418 of the light absorption structure 410 and a vertical line (s), perpendicular to the top surface 414, passing through a location where the top surface is connected to the inclined surface, referring to FIG. 8).

TABLE 3

| | Viewing angle | | | |
|---|---|---|---|---|
| | 0 degrees (front viewing angle) | 45 degrees | 60 degrees | 75 degrees |
| Sample X | 2.2 | 1.5 | 1.22 | 0.96 |
| Sample D | 2.2 | 1.88 | 1.77 | 1.58 |

As shown in Table 3, Gamma values of the sample D at different oblique viewing angles are closer to the Gamma value (2.2) at the front viewing angle than Gamma values of the sample X at different oblique viewing angles. Therefore, it can be known that, use of the collimation sheet and the micro-structure can also improve the quality of the image displayed at the oblique viewing angles.

Figure 9:
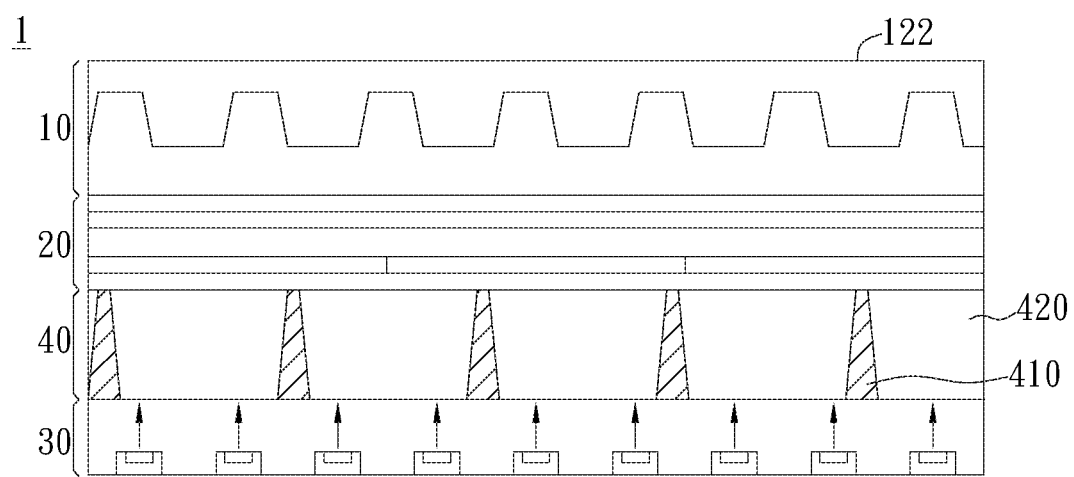
FIG. 9 is a schematic diagram of another embodiment of the display device.

FIG. 9 is a schematic diagram of another embodiment of the display device 1. In the embodiment in FIG. 9, the collimation sheet 40 is disposed between the light source module 30 and the display module 20. Specifically, the collimation sheet 40 is disposed on a side of the display module 20 opposite to the optical film 10. By using the design, light generated by the light source module 30 can pass through the collimation sheet 40 before passing through the display module 20, so as to further improve the quality of the image displayed at the oblique viewing angles.

Figure 10A:
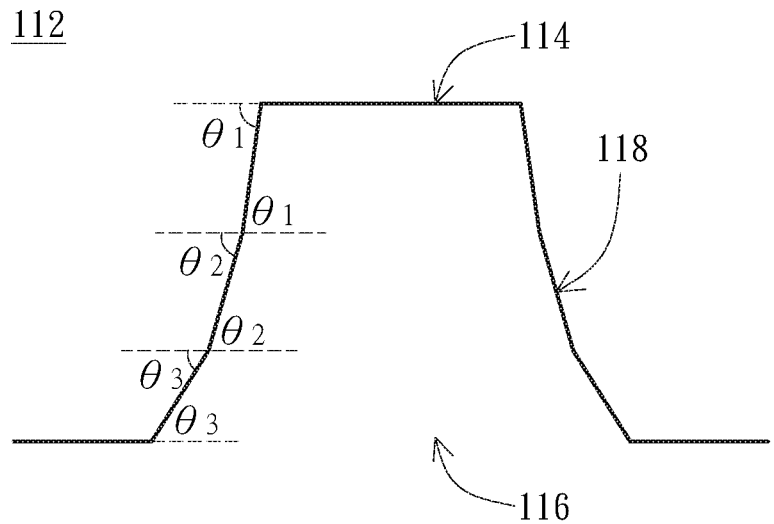
FIG. 10A and FIG. 10B are schematic diagrams of different embodiments of the micro-structure.
Figure 10B:
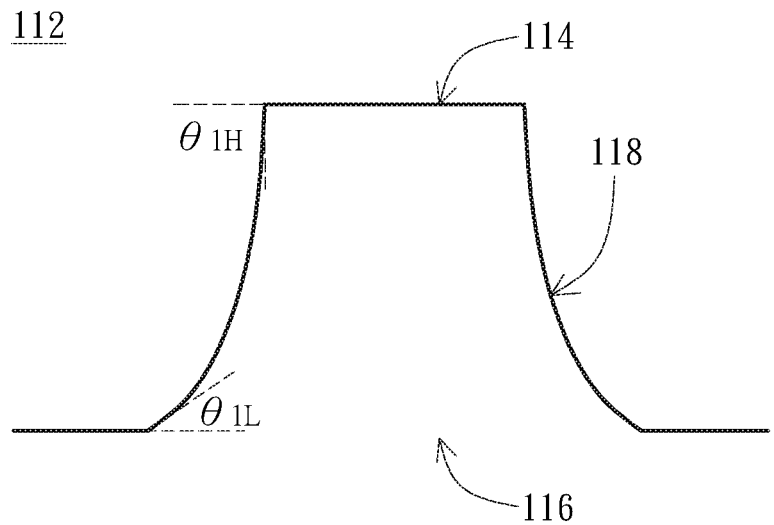

FIG. 10A and FIG. 10B are schematic diagrams of different embodiments of the micro-structure 112. In addition to the foregoing connection surface formed by the surface having a single slope, the connection surface formed by surfaces having a plurality of slopes can be used. As shown in FIG. 10A, each micro-structure 112 has the top surface 114, the bottom 116, and the connection surface 118 connecting the top surface 114 and the bottom 116. The connection surface 118 is formed by surfaces having at least two different slopes. In the example in FIG. 10A, the connection surface 118 is formed by surfaces having three different slopes. Each surface has one first base angle ($\theta_1$, $\theta_2$, or $\theta_3$, that is, the angle between the surface and a plane parallel to the top surface 114). It should be understood that, in each surface, each first base angle has a corresponding outside angle of the same size as the first base angle on the outside of the surface, and for convenience of indication, in some figures, a location of the outside angle is pointed out to replace the base angle.

As shown in FIG. 10B, the connection surface 118 is a concave curved surface. The concave curved surface can be considered to be formed by surfaces with the plurality of slopes, and each surface has the first base angle. Preferably, from the top surface 114 to the bottom 116, absolute values of the slopes decrease progressively. Using FIG. 10B as an example, a side of the concave curved surface close to the top surface 114 has a relatively large first base angle $\theta_{1H}$, and a side away from the top surface 114 has a relatively small first base angle $\theta_{1L}$.

On the whole, an average value of first base angles ranges from 81 degrees to 90 degrees. Therefore, the color shift generated in the display image at a side viewing angle (i.e. the oblique viewing angle) is alleviated. The average value of the first base angles is an average value of a sum of the first base angles of surfaces with different slopes on the connection surface. For example, in FIG. 10A, the average value of the first base angles is: $(\theta_1+\theta_2+\theta_3)/3$. In a case of taking the concave curved surface as the connection surface, the average value of the first base angles can be an average of a maximum value and a minimum value of the first base angles. For example, in FIG. 10B, the average value of the first base angles is: $(\theta_{1H}+\theta_{1L})/2$. Additionally, for the plurality of first base angles, the first base angles have a first variance value defined as: a half of a difference between the maximum value and the minimum value of the first base angles. A range of the first variance value is greater than or equal to 1 degree. Moreover, the range of the first variance value is preferably less than 9 degrees, thereby preventing a sharp angle (that is, an acute angle) from being formed between the top surface and the connection surface. That is, the angle between the top surface and the connection surface is greater than 90 degrees. On the whole, based on the foregoing two angle ranges, it can be known that a sum of the average value of the first base angles and the first variance value is less than 90 degrees.

Figure 11:
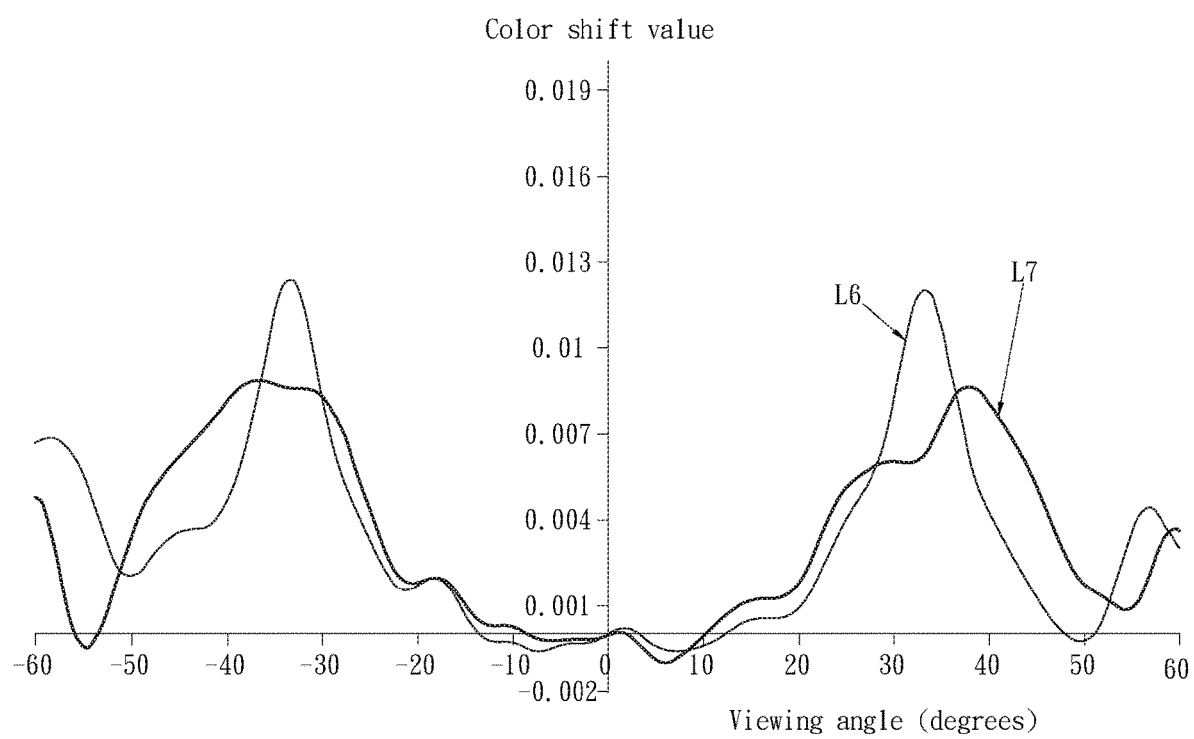
FIG. 11 is a diagram of a relationship between viewing angles and color shift values.

FIG. 11 is a diagram of a relationship between viewing angles and color shift values. As shown in FIG. 11, the transverse axis indicates the viewing angle (degrees), and the longitudinal axis indicates a color shift value. The color shift value is a color shift change of v' at different viewing angles in the CIE1976 (u', v') coordinate system. The color shift value is defined as: delta v' (color shift value)=v' (different viewing angle)–v' (front viewing angle), and is a dimensionless index. A larger color shift value indicates a more obvious color shift phenomenon. In FIG. 11, a curve L6 represents the display device having the optical film whose surface has a single slope, and the base angle is 83 degrees. A curve L7 represents the display device having the optical film whose surfaces have the plurality of slopes, and the base angle ranges from 78 degrees to 88 degrees (the first variance value is 5 degrees). As shown in FIG. 11, the curve L6 has an obvious bump (the corresponding range of viewing angles is approximately 25 degrees to 40 degrees, and approximately –25 degrees to –40 degrees). Compared with the curve L6, distribution of color shift values of the curve L7 is relatively flat, and the bump part is suppressed. Therefore, it can be known that use of the optical film whose surfaces have the plurality of slopes may alleviate the color shift generated in the display image at the side viewing angle.

Figure 12:
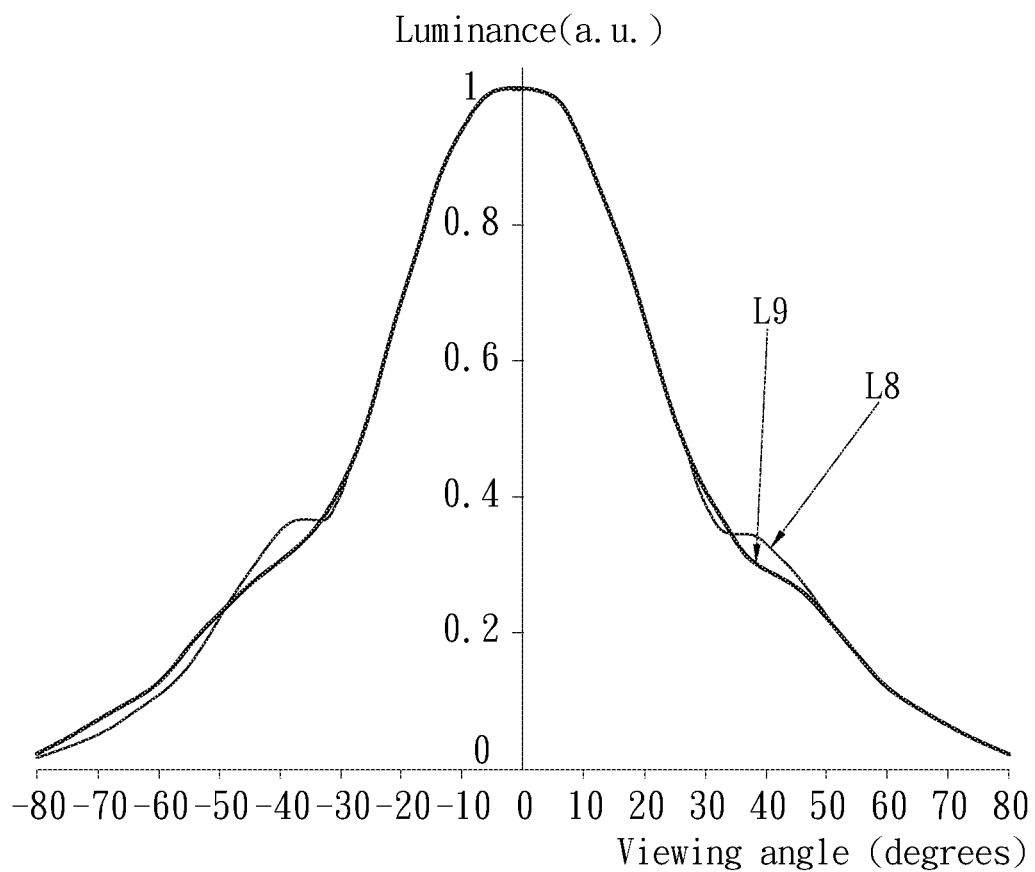
FIG. 12 is a diagram of a relationship between viewing angles and luminance.

FIG. 12 is a diagram of a relationship between viewing angles and luminance. As shown in FIG. 12, the transverse axis indicates the viewing angle, and the longitudinal axis indicates the luminance. In FIG. 12, a curve L8 represents the display device having the optical film whose surface has a single slope, and the base angle is 83 degrees. A curve L9 represents the display device having the optical film whose surfaces have the plurality of slopes, and the base angle ranges from 78 degrees to 88 degrees (the first variance value is 5 degrees). As shown in FIG. 12, compared with the curve L8, distribution of the luminance of the curve L9 at the oblique viewing angles is more even (that is, as the viewing angle increases, the luminance decrease rate is relatively stable, and the curve is relatively smooth).

Figure 13A:
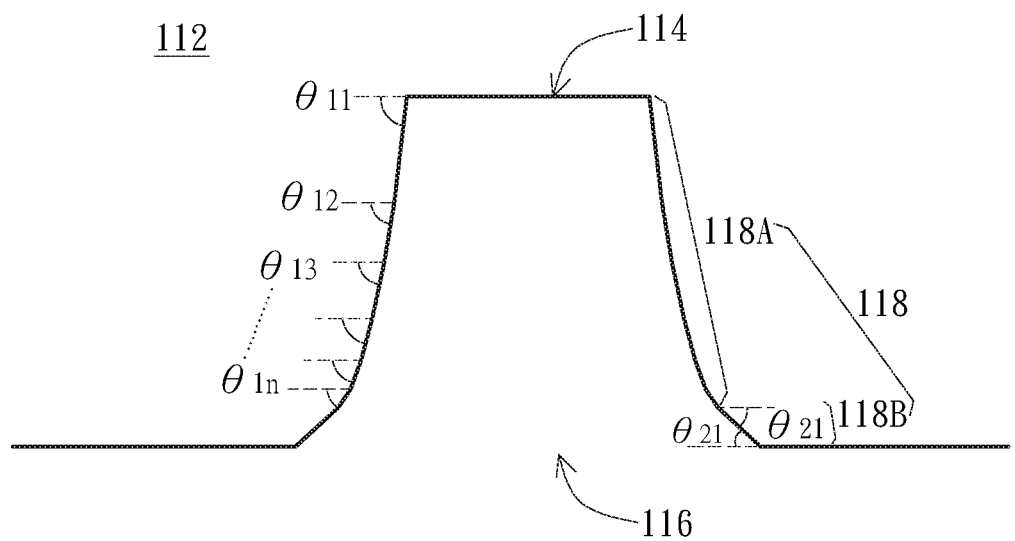
FIG. 13A is a schematic diagram of another embodiment of the micro-structure.

FIG. 13A is a schematic diagram of another embodiment of the micro-structure 112. As shown in FIG. 13A, the connection surface 118 includes a first part 118A and a second part 118B. The first part 118A can adopt the foregoing connection surface in FIG. 10A or FIG. 10B formed by surfaces having at least two different slopes. In the example in FIG. 13A, the first part 118A is formed by the plurality of inclined surfaces shown in FIG. 10A. In brief, compared with the structure in FIG. 10A, the structure in FIG. 13A is formed with two parts whose angle ranges are different. The first part falls within a relatively large angle range, the second part falls within a relatively small angle range, and the angle ranges of the two parts do not overlap.

As described above, the average value of the first base angles of the first part 118A ranges from 81 degrees to 90 degrees, the range of the first variance value is greater than or equal to 1 degree and less than 9 degrees, and the sum of the average value of the first base angles and the first variance value is less than 90 degrees. Preferably, from the top surface to the bottom surface, absolute values of the slopes of the first part decrease progressively. That is, from the top surface to the bottom, the first angle decreases gradually, i.e. $\theta_{11}>\theta_{12}> \ldots >\theta_{1n}$.

On the other hand, for the second part 118B, as shown in FIG. 13A, one side of the first part 118A is connected to the top surface 114, the other side is connected to the second part 118B, and the second part 118B has a surface with at least one different slope (compared with slopes of surfaces of the first part 118A). The inclination extent of the surface of the second part 118B is different from the inclination extent of surfaces of the first part 118A. Specifically, the second part 118B has at least one second base angle $\theta_{21}$. In the example in FIG. 13A, the second part 118B adopts the surface having a single slope. The second base angle ranges from 45 degrees to 55 degrees. Therefore, luminance decrease amplitude at the front viewing angle is controlled to be approximately 10% to improve a value of the full width at half maximum of the light distribution. In other embodiments, the first part 118A of the connection surface may be formed by surfaces with the plurality of different slopes, and the second part 118B of the connection surface may also be formed by surfaces with different slopes. Therefore, to sum up, the range of the average value of the first base angles of the first part (or the range of the first base angles) is different from the range of the average value of the second base angles (or the range of the second base angles), and the two ranges do not overlap.

Figure 13B:
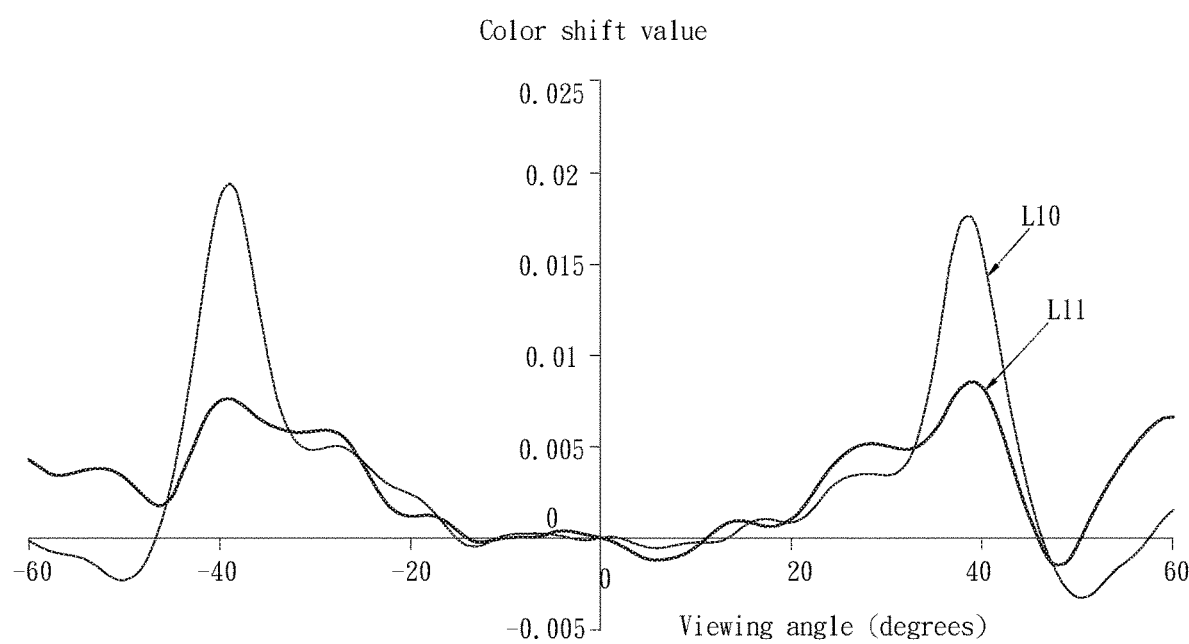
FIG. 13B and FIG. 13C are respectively a diagram of a relationship between viewing angles and color shift values and a diagram of a relationship between viewing angles and luminance.
Figure 13C:
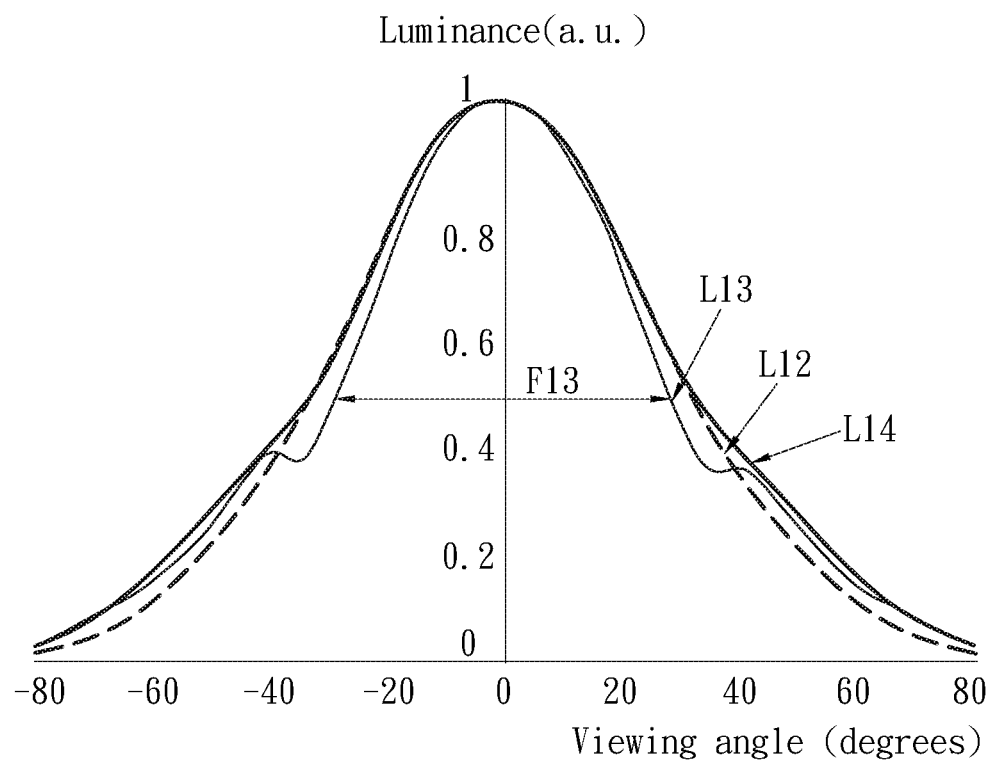

FIG. 13B and FIG. 13C are respectively a diagram of a relationship between viewing angles and color shift values and a diagram of a relationship between viewing angles and luminance. In FIG. 13B, a curve L10 represents the display device having the optical film whose surface has a single slope. A curve L11 represents the display device having the optical film having the first part and the second part shown in FIG. 13A, first base angles range from 79 degrees to 86 degrees (first base angles from a side of the top surface to a side of the bottom are respectively 86 degrees, 84.5 degrees, 82.9 degrees, 81 degrees, and 79 degrees, and an average value of the first base angles is 82.68 degrees), and the second base angle is 50 degrees. As shown in FIG. 13B, the curve L10 has an obvious bump. Compared with the curve L10, distribution of color shift values of the curve L11 is relatively flat, and the bump part is suppressed. Therefore, it can be known that use of the optical film whose surfaces have the plurality of slopes can alleviate the color shift generated in the display image at the side viewing angle.

In FIG. 13C, a curve L12 represents the display device in which no optical film is used. A curve L13 represents the display device having the optical film whose surface has a single slope. A curve L14 represents the display device having the optical film having the first part and the second part shown in FIG. 13A, the first base angle ranges from 79 degrees to 86 degrees (first base angles from a side of the top surface to a side of the bottom are respectively 86 degrees, 84.5 degrees, 82.9 degrees, 81 degrees, and 79 degrees, and the average value of the first base angles is 82.68 degrees), and the second base angle is 50 degrees. As shown in FIG. 13C, compared with the curve L13, the value of the full width at half maximum of the curve L14 increases, and is close to a value F13 of the full width at half maximum of the curve L12. Therefore, it can be known that use of the optical film whose surfaces have the plurality of slopes can improve the value of the full width at half maximum of the light distribution.

Figure 14A:
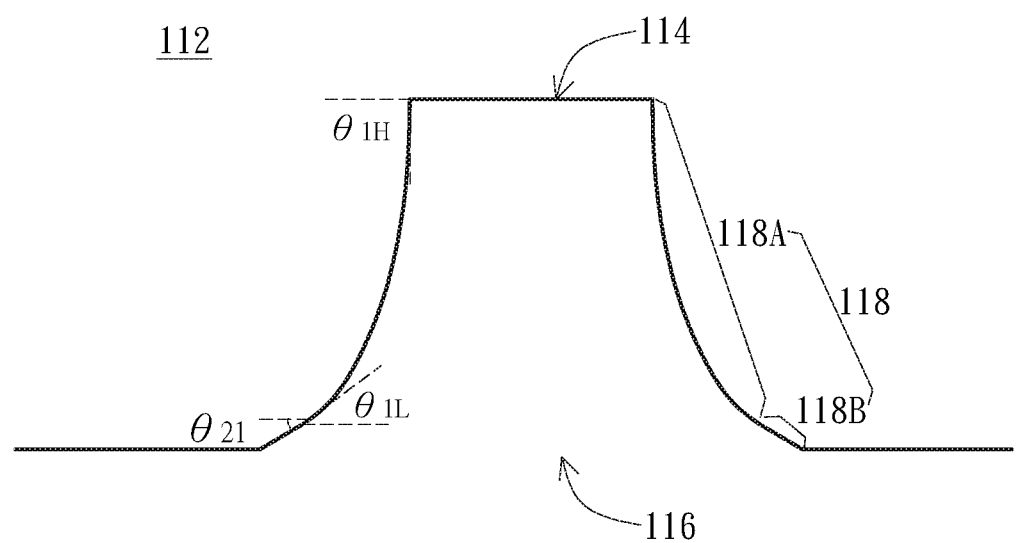
FIG. 14A is a schematic diagram of another embodiment of the micro-structure.

FIG. 14A is a schematic diagram of another embodiment of the micro-structure 112. As shown in FIG. 14A, the connection surface 118 includes the first part 118A and the second part 118B. In the example in FIG. 14A, the first part 118A is formed by the concave curved surface shown in FIG. 10B. A side of the concave curved surface close to the top surface 114 has a relatively large first base angle $\theta_{1H}$, and a side away from the top surface 114 has a relatively small first base angle $\theta_{1L}$. In brief, compared with the structure of the connection surface in FIG. 10B, the structure of the connection surface in FIG. 14A is formed with two parts whose base angle ranges are different. The base angle (that is, the first base angle) of the first part 118A falls within a relatively large angle range, and the base angle (that is, the second base angle) of the second part 118B falls within a relatively small angle range. The base angle range of the first part 118A and the base angle range of the second part 118B do not overlap.

As described above, the average value of the first base angles of the first part 118A ranges from 81 degrees to 90 degrees, the range of the first variance value is greater than or equal to 1 degree and less than 9 degrees, and the sum of the average value of the first base angles and the first variance value is less than 90 degrees. Preferably, from the top surface 114 to the bottom 116, absolute values of the slopes of the first part 118A decrease progressively. That is, from the top surface 114 to the bottom 116, degrees of the first base angle decrease gradually. That is, from the top surface 114 to the bottom 116, absolute values of tangential slopes of the concave curved surface at different locations decrease gradually.

On the other hand, for the second part 118B, in the example in FIG. 14A, the second part 118B adopts the surface having a single slope. The second base angles ranges from 45 degrees to 55 degrees. Therefore, luminance decrease amplitude at the front viewing angle is controlled to be approximately 10% to improve the value of the full width at half maximum of the light distribution. In other embodiments, the first part 118A of the connection surface may be formed by surfaces with the plurality of different slopes, and the second part 118B of the connection surface may also be formed by surfaces with a different slope. The range of the first base angle of the first part 118A is different from the range of the second base angle of the second part 118B, and the two ranges do not overlap.

Figure 14B:
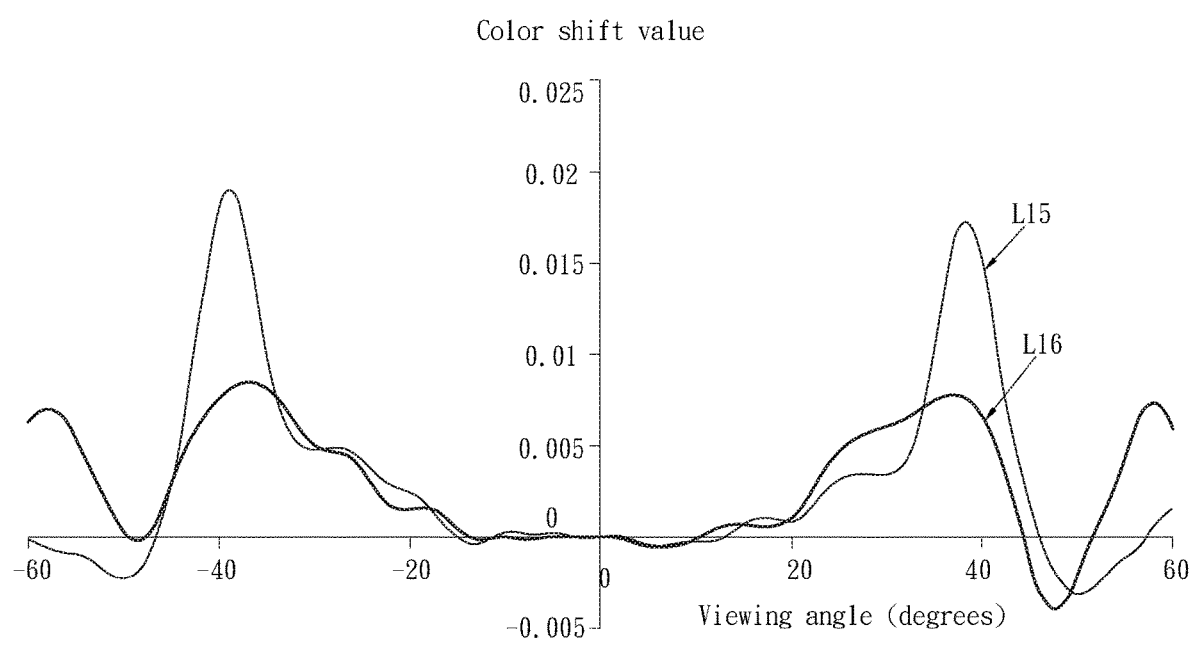
FIG. 14B and FIG. 14C are respectively a diagram of a relationship between viewing angles and color shift values and a diagram of a relationship between viewing angles and luminance.
Figure 14C:
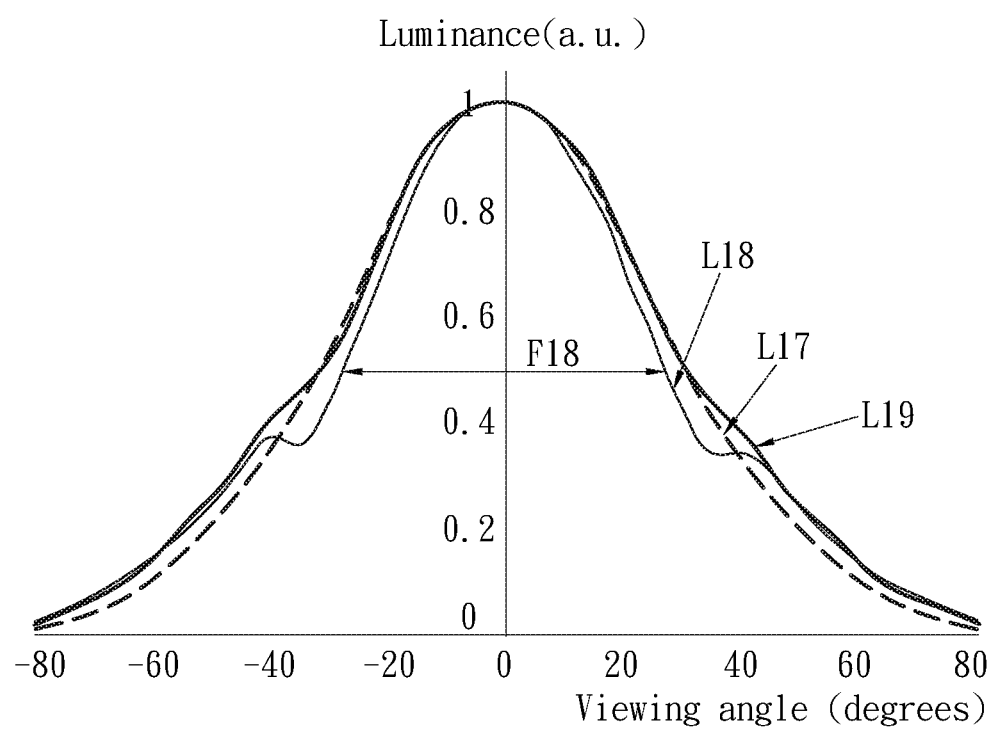

FIG. 14B and FIG. 14C are respectively a diagram of a relationship between viewing angles and color shift values and a diagram of a relationship between viewing angles and luminance. In FIG. 14B, a curve L15 represents the display device having the optical film whose surface has a single slope. A curve L16 represents the display device having the optical film having the first part 118A and the second part 118B shown in FIG. 14A, first base angles range from 79 degrees to 86 degrees (the average value of the first base angles is 82.5 degrees), and the second base angle is 50 degrees. As shown in FIG. 14B, the curve L15 has an obvious bump. Compared with the curve L15, distribution of color shift values of the curve L16 is relatively flat, and the bump part is suppressed. Therefore, it can be known that use of the optical film whose surfaces have the plurality of slopes can alleviate the color shift generated in the display image at the side viewing angle.

In FIG. 14C, a curve L17 represents the display device in which no optical film is used. A curve L18 represents the display device having the optical film whose surface has a single slope. A curve L19 represents the display device having the optical film having the first part 118A and the second part 118B shown in FIG. 14A, first base angles range from 79 degrees to 86 degrees (the average value of the first base angles is 82.5 degrees), and the second base angle is 50 degrees. As shown in FIG. 14C, compared with the curve L18, a value F18 of the full width at half maximum of the curve L19 increases, and is close to a value of the full width at half maximum of the curve L17. Therefore, it can be known that use of the optical film whose surfaces have the plurality of slopes can improve the value of the full width at half maximum of the light distribution.

Figure 15:
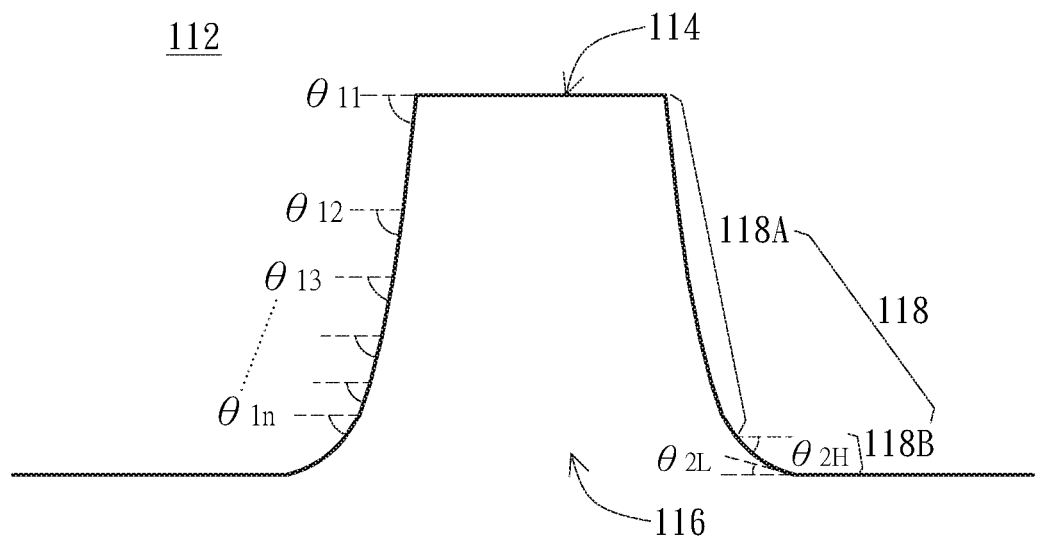
FIG. 15 is a schematic diagram of another embodiment of the micro-structure.

FIG. 15 is a schematic diagram of another embodiment of the micro-structure 112. Compared with the example in FIG. 13A, the second part 118B can be replaced with the concave curved surface. As shown in FIG. 15, the connection surface 118 includes the first part 118A and the second part 118B. The first part 118A is formed by the plurality of inclined surfaces shown in FIG. 10A. The concave curved surface similar to that in FIG. 10B is used as the second part 118B in FIG. 15.

Figure 16A:
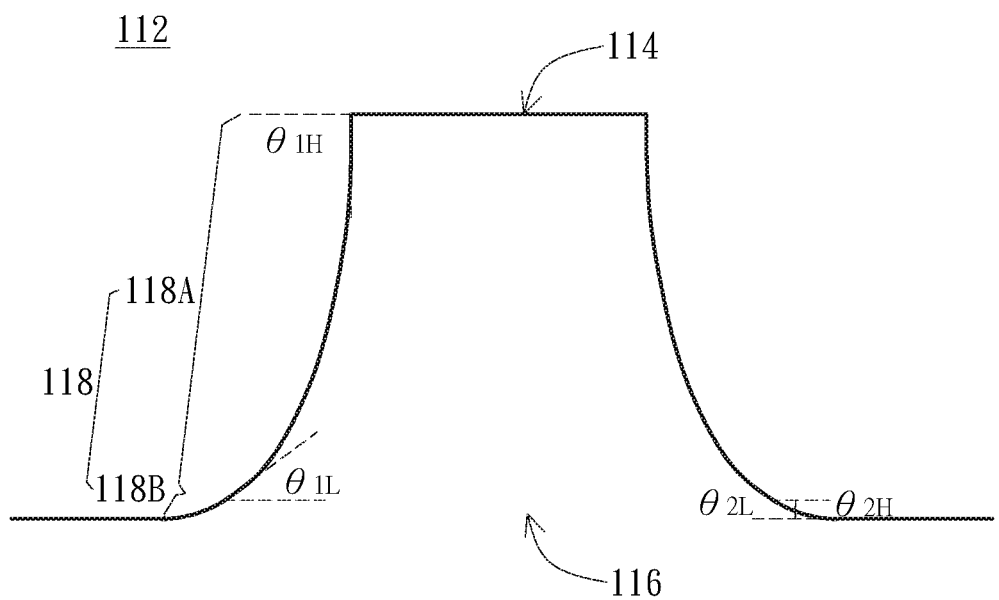
FIG. 16A is a schematic diagram of another embodiment of the micro-structure.

FIG. 16A is a schematic diagram of another embodiment of the micro-structure 112. Compared with the examples in FIG. 13A and FIG. 14A, both the first part 118A and the second part 118B can be replaced with the concave curved surface. As shown in FIG. 16A, the connection surface 118 includes the first part 118A and the second part 118B. The first part 118A is formed by the concave curved surface shown in FIG. 10B. The concave curved surface similar to that in FIG. 10B is used as the second part 118B. The average value of second base angles ranges from 45 degrees to 55 degrees.

In FIG. 15 and FIG. 16A, the second part 118B using the concave curved surface may be considered to have the plurality of second base angles. A second variance value of the second base angles is defined as: a half of a difference between a maximum value and a minimum value of the second base angles. A range of the second variance value is greater than or equal to 0 degrees. Moreover, the range of the second variance value is preferably less than 10 degrees. Therefore, luminance decrease amplitude at the front viewing angle is controlled to be approximately 10% to improve the value of the full width at half maximum of the light distribution. Moreover, a sharp angle can be prevented from being formed at a bonding location between the first part 118A and the second part 118B. That is, a surface nearby the bonding location between the first part 118A and the second part 118B is relatively smooth. On the whole, the range of the second variance value is greater than or equal to 0 degrees and less than 10 degrees.

Further, based on the foregoing angle range (the average value of the first base angles ranges from 81 degrees to 90 degrees, the range of the first variance value is greater than or equal to 1 degree and less than 9 degrees, the average value of the second base angles ranges from 45 degrees to 55 degrees, and the range of the second variance value is greater than or equal to 0 degrees and less than 10 degrees), it can be known that a difference between the average value of the first base angles and the first variance value is greater than a sum of the average value of the second base angles and the second variance value by 7 degrees. Additionally, it can also be known that the difference between the average value of the first base angles and the average value of the second base angles is greater than 26 degrees.

Figure 16B:
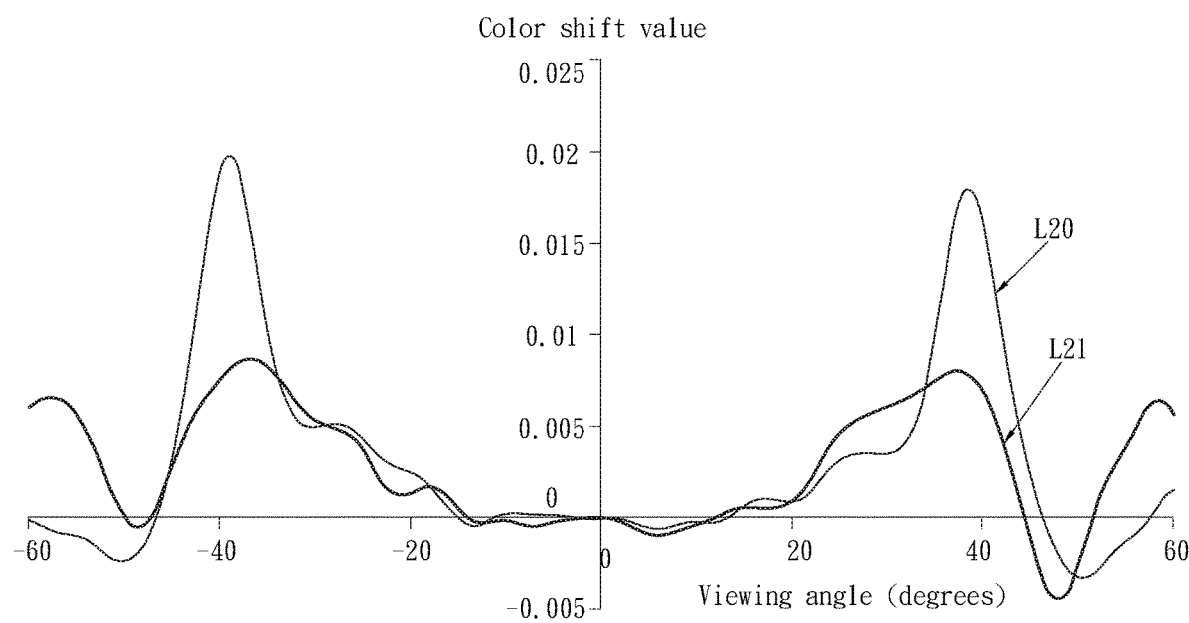
FIG. 16B and FIG. 16C are respectively a diagram of a relationship between viewing angles and color shift values and a diagram of a relationship between viewing angles and luminance.
Figure 16C:
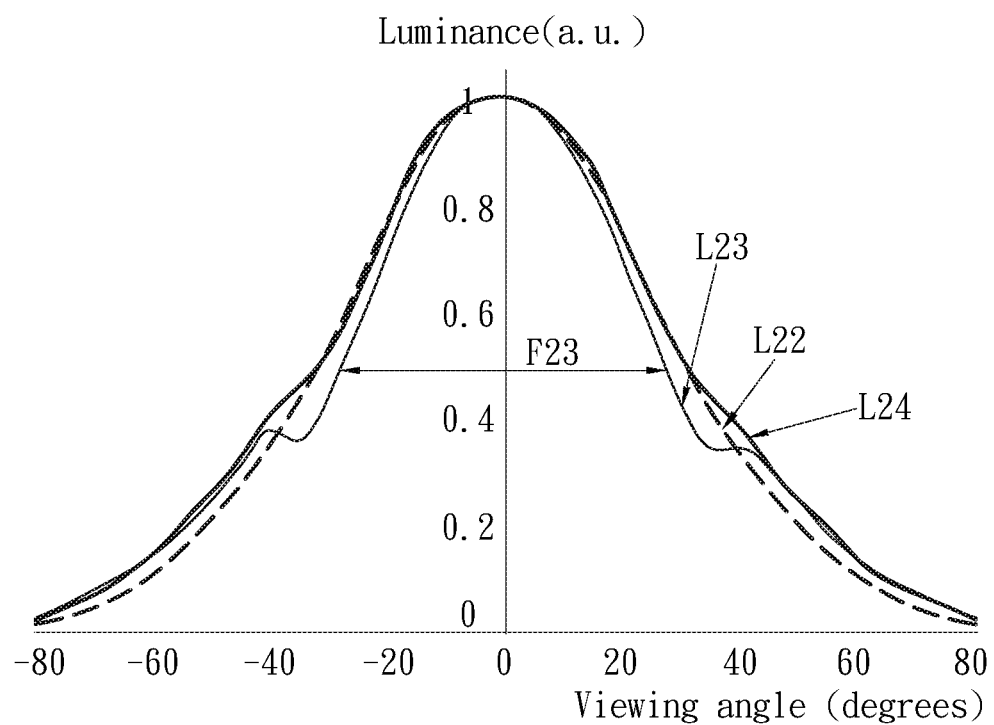

FIG. 16B and FIG. 16C are respectively a diagram of a relationship between viewing angles and color shift values and a diagram of a relationship between viewing angles and luminance. In FIG. 16B, a curve L20 represents the display device having the optical film whose surface has a single slope. A curve L21 represents the display device having the optical film having the first part and the second part shown in FIG. 16A. The first base angles range from 79 degrees to 86 degrees (the average value of the first base angles is 82.5 degrees), and the second base angles range from 46 degrees to 54 degrees (the average value of the second base angles is 50 degrees). As shown in FIG. 16B, the curve L20 has an obvious bump. Compared with the curve L20, distribution of color shift values of the curve L21 is relatively flat, and the bump part is suppressed. Therefore, it can be known that use of the optical film whose surfaces have the plurality of slopes can alleviate the color shift generated in the display image at the side viewing angle.

In FIG. 16C, a curve L22 represents the display device in which no optical film is used. A curve L23 represents the display device having the optical film whose surface has a single slope. A curve L24 represents the display device having the optical film having the first part 118A and the second part 118B shown in FIG. 16A. The first base angles range from 79 degrees to 86 degrees (the average value of the first base angles is 82.5 degrees), and the second base angles range from 46 degrees to 54 degrees (the average value of the second base angles is 50 degrees). As shown in FIG. 16C, compared with the curve L23, a value F23 of the full width at half maximum of the curve L24 increases, and is close to a value of the full width at half maximum of the curve L22. Therefore, it can be known that use of the optical film whose surfaces have the plurality of slopes can improve the value of the full width at half maximum of the light distribution.

Figure 17A:
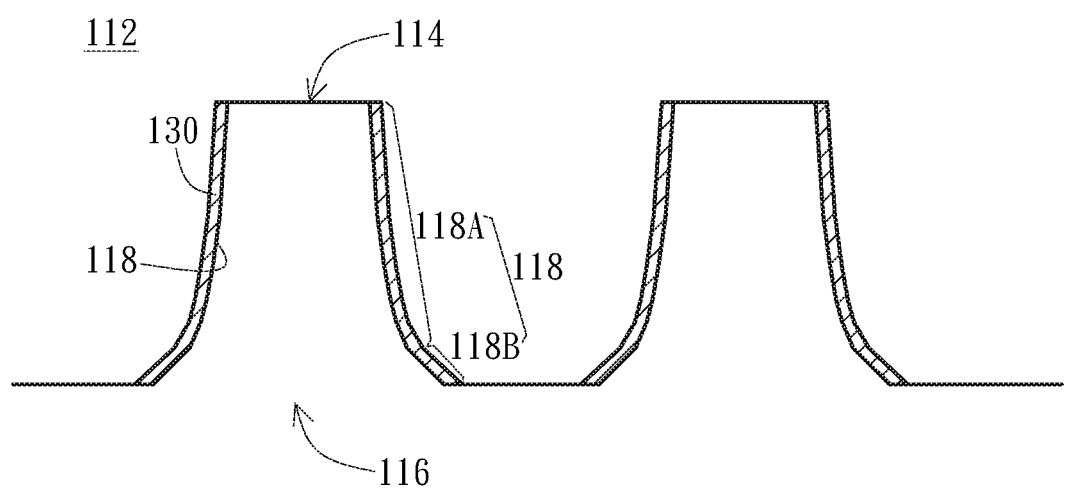
FIG. 17A is a schematic diagram of another embodiment of the micro-structure.

FIG. 17A is a schematic diagram of another embodiment of the micro-structure 112. In the example in FIG. 17A, a structure is substantially the same as that in FIG. 13A, and the first part 118A is formed by the plurality of inclined surfaces shown in FIG. 10A. The second part 118B adopts the surface having a single slope. The difference is that, as shown in FIG. 17A, the first layer of the optical film further includes a dye layer 130 attached to the connection surface 118 and extending from the first part 118A to the second part 118B. For a light ray with a relatively large incident angle, when the light ray is guided to the front viewing angle, the light ray is absorbed by the dye layer 130. Therefore, in addition to providing the effect of alleviating color washout of the display image, a decrease amplitude of a contrast of the display image at the front viewing angle can be controlled to be approximately 10%.

Figure 17B:
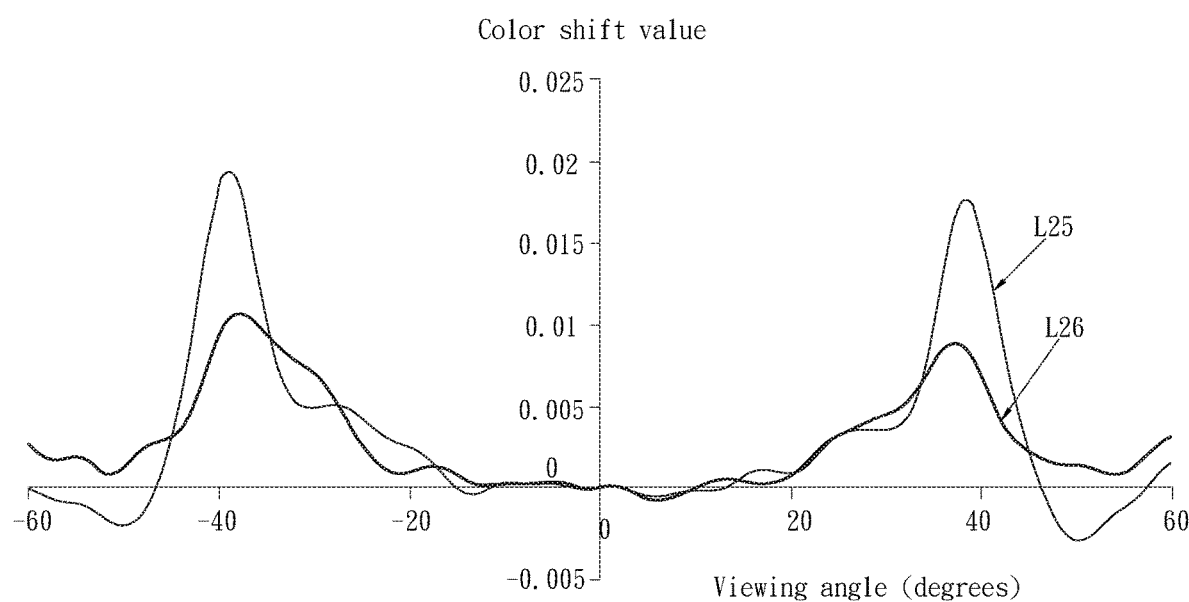
FIG. 17B and FIG. 17C are respectively a diagram of a relationship between viewing angles and color shift values and a diagram of a relationship between viewing angles and luminance.
Figure 17C:
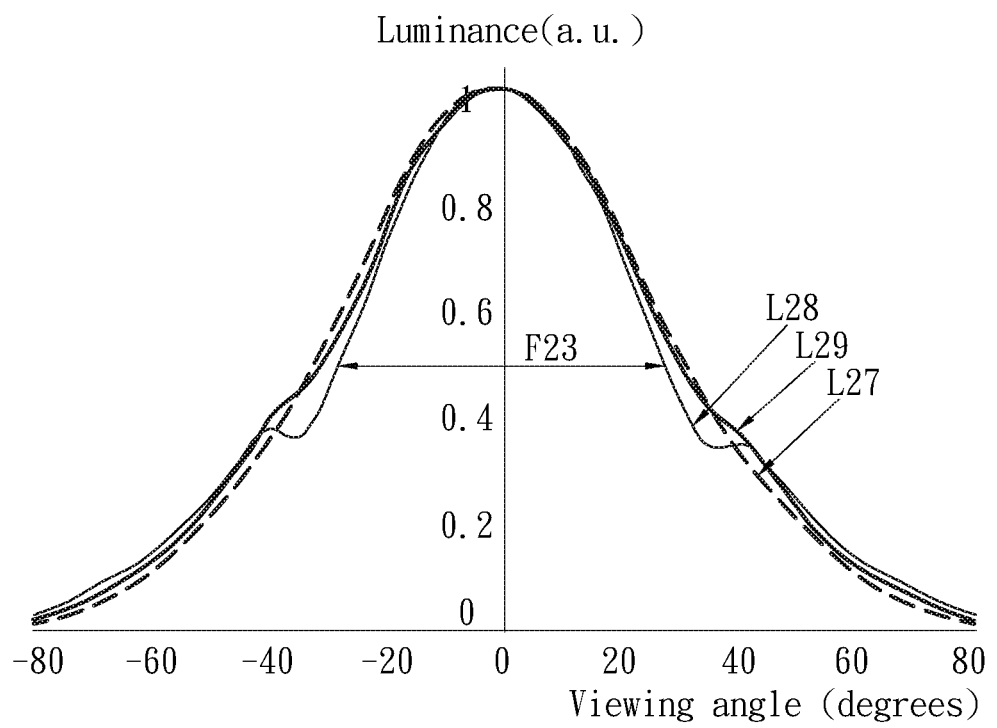

FIG. 17B and FIG. 17C are respectively a diagram of a relationship between viewing angles and color shift values and a diagram of a relationship between viewing angles and luminance. In FIG. 17B, a curve L25 represents the display device having the optical film whose surface has a single slope. A curve L26 represents the display device having the optical film shown in FIG. 17A, first base angles range from 79 degrees to 86 degrees (first base angles from a side of the top surface to a side of the bottom are respectively 86 degrees, 84.5 degrees, 82.9 degrees, 81 degrees, and 79 degrees, and the average value of the first base angles is 82.68 degrees), and the second base angle is 50 degrees. As shown in FIG. 17B, the curve L25 has an obvious bump. Compared with the curve L25, distribution of color shift values of the curve L26 is relatively flat, and the bump part is suppressed. Therefore, it can be known that use of the optical film whose surfaces have the plurality of slopes together with the dye layer can alleviate the color shift in the display image at the side viewing angle.

In FIG. 17C, a curve L27 represents the display device in which no optical film is used. A curve L28 represents the display device having the optical film whose surface has a single slope. A curve L29 represents the display device having the optical film shown in FIG. 17A, first base angles range from 79 degrees to 86 degrees (first base angles from a side of the top surface to a side of the bottom are respectively 86 degrees, 84.5 degrees, 82.9 degrees, 81 degrees, and 79 degrees, and the average value of the first base angles is 82.68 degrees), and the second base angle is 50 degrees. As shown in FIG. 17C, compared with the curve L28, a value F28 of the full width at half maximum of the curve L29 increases, and is close to a value of the full width at half maximum of the curve L27. Therefore, it can be known that use of the optical film whose surfaces have the plurality of slopes together with the dye layer can improve the value of the full width at half maximum of the light distribution.

Table 4 shows a comparison result of Gamma values corresponding to different display devices at different viewing angles. A sample X1 is the display device in which no optical film is used. A sample E is the display device in which the optical film is used, the optical film has the micro-structure shown in FIG. 13A, first base angles range from 79 degrees to 86 degrees, the second base angle is 50 degrees, the first pitch is 30 μm, the width-to-spacing ratio (W1/W2) is 1.167, and the difference between refractive indexes of the first layer 110 and the second layer 120 (referring to FIG. 1A) is 0.17. A sample F is the display device in which the optical film is used, the optical film has the micro-structure shown in FIG. 14A, first base angles range from 79 degrees to 86 degrees, the second base angle is 50 degrees, the first pitch is 30 μm, the width-to-spacing ratio (W1/W2) is 1.167, and the difference between refractive indexes of the first layer 110 and the second layer 120 (referring to FIG. 1A) is 0.17. A sample G is the display device in which the optical film is used, the optical film has the micro-structure shown in FIG. 16A, first base angles range from 79 degrees to 86 degrees, second base angles range from 46 degrees to 54 degrees, the first pitch is 30 μm, the width-to-spacing ratio (W1/W2) is 1.167, and the difference between refractive indexes of the first layer 110 and the second layer 120 (referring to FIG. 1A) is 0.17. A sample H is the display device in which the optical film is used, the optical film has the micro-structure shown in FIG. 17A, first base angles range from 79 degrees to 86 degrees, the second base angle is 50 degrees, the first pitch is 30 μm, the width-to-spacing ratio (W1/W2) is 1.167, and the difference between refractive indexes of the first layer 110 and the second layer 120 (referring to FIG. 1A) is 0.17.

TABLE 4

| | Viewing angle | | |
| --- | --- | --- | --- |
| | 0 degrees (front viewing angle) | 45 degrees | 60 degrees |
| Sample X1 | 2.2 | 1.5 | 1.22 |
| Sample E | 2.2 | 1.69 | 1.53 |
| Sample F | 2.2 | 1.70 | 1.53 |
| Sample G | 2.2 | 1.70 | 1.53 |
| Sample H | 2.2 | 1.66 | 1.51 |

As shown in Table 4, Gamma values of the sample E at different oblique viewing angles are closer to a Gamma value (2.2) at a front viewing angle than Gamma values of the sample X1 at different oblique viewing angles. Each of the sample F, the sample G and the sample H can provide an effect that Gamma values at oblique viewing angles is relatively close to the Gamma value at the front viewing angle. Therefore, it can be known that, use of the foregoing micro-structure may improve the quality of the image displayed at the oblique viewing angles.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An optical film, used to receive an incident light, the optical film comprising:
a first layer having a plurality of micro-structures respectively extending along a first direction and arranged side by side at an interval, wherein the micro-structure has a top surface, a bottom, and a connection surface connecting the top surface and the bottom; the connection surface comprises a first part and a second part, a side of the first part is connected to the top surface, and another side of the first part is connected to the second part; and
a second layer disposed on the first layer and attached to the first layer, the plurality of micro-structures protruding toward the second layer, wherein a first pitch exists between each micro-structure and an adjacent micro-structure in a side-by-side arrangement direction, and the first pitch is greater than 10 times a wavelength of the incident light;
wherein the first part has one or more first base angles determined between a surface of the first part and a plane parallel to the top surface such that an average value of all the first base angles is within a range of 81 degrees to 90 degrees, the plurality of first base angles having a first variance value defined as half of a difference between a maximum value and a minimum value of the plurality of first base angles, the first variance value being greater than or equal to 1 degree and less than 9 degrees; and
the second part has one or more second base angles determined between a surface of the second part and the plane parallel to the top surface such that an average value of all the second base angles is within a range of 45 degrees to 55 degrees, the plurality of second base angles having a second variance value defined as half of a difference between a maximum value and a minimum value of the plurality of second base angles, the second variance value being greater than or equal to 0 degrees and less than 10 degrees.

2. The optical film of claim 1, wherein the top surface has a top side transversely cutting the first direction; a spacing exists between the bottom of each micro-structure and a bottom of the adjacent micro-structure; a ratio of a width of the top side to the spacing ranges from 0.8 to 1.45.

3. The optical film of claim 2, wherein the connection surface has a first value being a difference between the width of the top side and a width of the bottom, and a ratio of the first value to the first pitch is less than 0.1.

4. The optical film of claim 2, wherein each micro-structure has an oblique side transversely cutting the first direction, the micro-structures has a first micro-structure and an adjacent second micro-structure staggered from each other; the first micro-structure has a first height greater than a second height of the second micro-structure along a protruding direction; a first angle exists between the oblique side and the bottom of the first micro-structure; a second angle exists between the oblique side and the bottom of the second micro-structure;
the first angle is greater than the second angle.

5. The optical film of claim 1, wherein the second layer has a light exiting surface located on a surface of the second layer opposite to the first layer; a refractive index of the first layer is less than a refractive index of the second layer; a difference between the refractive indexes of the first layer and the second layer is greater than 0.12.

6. The optical film of claim 1, wherein the first part is formed by a surface having at least two different slopes; from the top surface to the bottom, absolute values of the slopes of the first part decrease progressively.

7. The optical film of claim 6, wherein the second part has a surface with at least one different slope.

8. The optical film of claim 7, further comprising a dye layer attached to the connection surface and extending from the first part to the second part.

9. The optical film of claim 1, wherein a sum of the average value of the plurality of first base angles and the first variance value is less than 90 degrees; a difference between the average value of the plurality of first base angles and the first variance value is greater than a sum of the average value of the plurality of second base angles and the second variance value by 7 degrees.

10. The optical film of claim 1, wherein a difference between the average value of the plurality of first base angles and the average value of the plurality of second base angles is greater than 26 degrees.

11. A display device comprising:
a display module having a plurality of sub-pixels;
an optical film, used to receive an incident light, the optical film being disposed on the display module, the optical film comprising:
a first layer having a plurality of micro-structures respectively extending along a first direction and arranged side by side at an interval, wherein the micro-structure has a top surface, a bottom, and a connection surface connecting the top surface and the bottom; the connection surface comprises a first part and a second part, a side of the first part is connected to the top surface, and another side of the first part is connected to the second part; and
a second layer disposed on the first layer and attached to the first layer, the plurality of micro-structures protruding toward the second layer; and
a light source module disposed on a side of the display module opposite to the optical film to generate the incident light,
wherein a first pitch exists between each micro-structure and an adjacent micro-structure in a side-by-side arrangement direction, and the first pitch is greater than 10 times a wavelength of the incident light and less than 0.5 times a width of each sub-pixel;
wherein the first part has one or more first base angles determined between a surface of the first part and a plane parallel to the top surface such that an average value of all the first base angles is within a range of 81 degrees to 90 degrees, the plurality of first base angles having a first variance value defined as half of a difference between a maximum value and a minimum value of the plurality of first base angles, the first variance value being greater than or equal to 1 degree and less than 9 degrees; and
the second part has one or more second base angles determined between a surface of the second part and the plane parallel to the top surface such that an average value of all the second base angles is within a range of 45 degrees to 55 degrees, the plurality of second base angles having a second variance value defined as half of a difference between a maximum value and a minimum value of the plurality of second base angles, the second variance value being greater than or equal to 0 degrees and less than 10 degrees.

12. The display device of claim 11, wherein each sub-pixel comprises a pixel electrode; the pixel electrode has an electrode trunk extending along the first direction and dividing the pixel electrode into a plurality of areas; a half of a distance between the electrode trunk and an electrode trunk of the adjacent sub-pixel is greater than the first pitch.

13. The display device of claim 11, further comprising a collimation sheet disposed on the light source module and located on an opposite side of a light exiting surface of the optical film; the collimation sheet has a plurality of light absorption structures extending along the first direction and arranged side by side at an interval, wherein a second pitch exists between each light absorption structure and an adjacent light absorption structure; the second pitch is greater than the first pitch and less than the width of each sub-pixel.

14. The display device of claim 13, wherein the second pitch is less than 0.82 times the width of each sub-pixel.

15. The display device of claim 13, wherein the second pitch is less than 0.63 times the width of each sub-pixel.

16. The display device of claim 13, wherein the collimation sheet is disposed on a side of the display module opposite to the optical film.

17. The display device of claim 13, wherein the collimation sheet is disposed between the display module and the optical film.

18. The optical film of claim 11, wherein the top surface has a top side transversely cutting the first direction; a spacing exists between the bottom of each micro-structure and a bottom of the adjacent micro-structure; a ratio of a width of the top side to the spacing ranges from 0.8 to 1.45.

19. The optical film of claim 18, wherein the connection surface has a first value being a difference between the width of the top side and a width of the bottom, and a ratio of the first value to the first pitch is less than 0.1.

20. The optical film of claim 18, wherein each micro-structure has an oblique side transversely cutting the first direction, the micro-structures has a first micro-structure and an adjacent second micro-structure staggered from each other; the first micro-structure has a first height greater than a second height of the second micro-structure along a protruding direction; a first angle exists between the oblique side and the bottom of the first micro-structure; a second angle exists between the oblique side and the bottom of the second micro-structure; the first angle is greater than the second angle.

21. The optical film of claim 11, wherein the second layer has a light exiting surface located on a surface of the second layer opposite to the first layer; a refractive index of the first layer is less than a refractive index of the second layer; a difference between the refractive indexes of the first layer and the second layer is greater than 0.12.

22. The optical film of claim 11, wherein the first part is formed by a surface having at least two different slopes; from the top surface to the bottom, absolute values of the slopes of the first part decrease progressively.

23. The optical film of claim 22, wherein-the second part has a surface with at least one different slope.

24. The optical film of claim 23, further comprising a dye layer attached to the connection surface and extending from the first part to the second part.

25. The optical film of claim 11, wherein a sum of the average value of the plurality of first base angles and the first variance value is less than 90 degrees; a difference between the average value of the plurality of first base angles and the first variance value is greater than a sum of the average value of the plurality of second base angles and the second variance value by 7 degrees.

26. The optical film of claim 11, wherein a difference between the average value of the plurality of first base angles and the average value of the plurality of second base angles is greater than 26 degrees.

* * * * *